US011496964B2

(12) United States Patent
Yang et al.

(10) Patent No.: US 11,496,964 B2
(45) Date of Patent: Nov. 8, 2022

(54) POWER BOOSTING DESIGN FOR MULTI-SLOT SHARED CHANNELS

(71) Applicant: QUALCOMM Incorporated, San Diego, CA (US)

(72) Inventors: Wei Yang, San Diego, CA (US); Wanshi Chen, San Diego, CA (US); Seyed Ali Akbar Fakoorian, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/945,407

(22) Filed: Jul. 31, 2020

(65) Prior Publication Data

US 2021/0037478 A1 Feb. 4, 2021

Related U.S. Application Data

(60) Provisional application No. 62/882,124, filed on Aug. 2, 2019.

(51) Int. Cl.
*H04W 56/00* (2009.01)
*H04W 52/14* (2009.01)
(Continued)

(52) U.S. Cl.
CPC ......... *H04W 52/146* (2013.01); *H04W 52/42* (2013.01); *H04W 72/046* (2013.01);
(Continued)

(58) Field of Classification Search
CPC ............... H04W 52/146; H04W 52/42; H04W 72/0413; H04W 72/0446; H04W 72/046; H04W 72/0473; H04W 72/0493
(Continued)

(56) References Cited

U.S. PATENT DOCUMENTS

2010/0110969 A1* 5/2010 Yu ................... H04B 7/15592
370/335
2018/0103428 A1* 4/2018 Jiang ................... H04W 76/27
(Continued)

FOREIGN PATENT DOCUMENTS

WO WO-2018071155 A1 4/2018

OTHER PUBLICATIONS

"3rd Generation Partnership Project, Technical Specification Group Radio Access Network, NR, Physical Layer Procedures for Control (Release 15)", 3GPP Standard, Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V15.6.0, Jun. 24, 2019 (Jun. 24, 2019), pp. 1-107, XP051754327, [retrieved on Jun. 24, 2019] section 1 "Scope" section 8 "Random access procedure".
(Continued)

*Primary Examiner* — Sai Ming Chan
(74) *Attorney, Agent, or Firm* — Holland & Hart LLP

(57) ABSTRACT

Methods, systems, and devices for wireless communications are described to enable a user equipment (UE) to perform power-boosting to increase power for specific portions (e.g., repetitions, symbols, slots) of an uplink transmission, where the portion may overlap with a previously-scheduled uplink transmission from another UE. The base station may configure the UE to apply power-boosting to all portions of the uplink transmission or over specific slots or repetitions of the uplink transmission, or to apply power-boosting if the uplink transmission occupies one slot or repetition. The base station may configure the UE semi-statically or dynamically with the power-boosting configuration, and may configure the UE to perform power-boosting for repetitions of the uplink transmission corresponding to one or more predefined transmission reception points, panels, beams, or
(Continued)

precoders. The UE may transmit the uplink transmission to the base station based on the power-boosting configuration.

27 Claims, 21 Drawing Sheets

(51) Int. Cl.
*H04W 72/04* (2009.01)
*H04W 52/42* (2009.01)

(52) U.S. Cl.
CPC ... *H04W 72/0413* (2013.01); *H04W 72/0446* (2013.01); *H04W 72/0473* (2013.01); *H04W 72/0493* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0351705 | A1* | 12/2018 | Uchino | H04L 1/189 |
| 2019/0075589 | A1* | 3/2019 | Jeon | H04L 1/08 |
| 2019/0141750 | A1* | 5/2019 | Lee | H04W 74/0816 |

OTHER PUBLICATIONS

"3rd Generation Partnership Project; Technical Specification Group Radio Access Network; Study on Physical Layer Enhancements for NR Ultra-Reliable and Low Latency Case (URLLC) (Release 16)", 3GPP Standard, Technical Report, 3GPP TR 38.824, 3rd Generation Partnership Project (3GPP), Mobile Competence Centre, 650, Route Des Lucioles, F-06921 Sophia-Antipolis Cedex, France, No. V16.0.0, Mar. 27, 2019 (Mar. 27, 2019), pp. 1-78, XP051722955, pp. 1-92, [retrieved on Mar. 27, 2019], Chapter 6.4.2, "out-of-order HARQ and PUSCH scheduling".

International Search Report and Written Opinion—PCT/US2020/044684—ISA/EPO—Nov. 13, 2020.

Motorola Mobility, et al., "UL Inter UE Tx Prioritization/Multiplexing for URLLC Operation", 3GPP Draft, 3GPP TSG RAN WG1 #96, R1-1902846, ULPI Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600542, 2 pages, Retrieved from the Internet: URL: http://www.3gpp.org/ftp/tsg%5Fran/WG1%5FRL1/TSGR1%5F96/Docs/R1%2D1902846%2Ezip. [retrieved on Feb. 16, 2019] paragraph 2.2.

Qualcomm Incorporated: "UL Inter-UE Tx Multiplexing and Prioritization", 3GPP Draft, 3GPP TSG-RAN WG1 #96, R1-1903008, UL Inter-UE Tx Multiplexing and Prioritization, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600705, 17 pages, Retrieved from the Internet: URL: http://www.3gpp.org/ftp/tsg%5Fran/WG1%5FRL1/TSGR1%5F96/Docs/R1%2D1903008%2Ezip. [retrieved on Feb. 16, 2019] paragraph 2 paragraph 4.

Qualcomm Incorporated: "Uplink inter-UE Tx Multiplexing and Prioritization", 3GPP Draft, 3GPP TSG-RAN WG1 #98, R1-1909268, Uplink inter-UE Tx Multiplexing and Prioritization, 3rd Generation Partnership Project (3GPP), Mobile Competence Centre, 650, Route Des Lucioles, F-06921 Sophia-Antipolis CE, vol. RAN WG1, No. Prague, Czech Republic, Aug. 26, 2019-Aug. 30, 2019, Aug. 17, 2019 (Aug. 17, 2019), XP051765873, 10 pages, Retrieved from the Internet: URL: http://www.3gpp.org/ftp/tsg_ran/WG1_RL1/TSGR1_98/Docs/R1-1909268.zip. [retrieved on Aug. 17, 2019] paragraph 3.

* cited by examiner

POWER BOOSTING DESIGN FOR MULTI-SLOT SHARED CHANNELS

CROSS REFERENCE

The present application for patent claims priority to U.S. Provisional Patent Application No. 62/882,124 by Yang, et al., entitled "Power Boosting Design for Multi-Slot Shared Channels," filed Aug. 2, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless systems, uplink transmissions from two or more UEs may overlap at a base station and may interfere with one another. The interference between the uplink transmissions may degrade signal quality and may reduce the ability of the base station to receive and decode one or more of the uplink transmissions.

SUMMARY

The described techniques relate to improved methods, systems, devices, and apparatuses that support power-boosting design for multi-slot shared channels. Generally, the described techniques provide for a user equipment (UE) to perform power-boosting (e.g., increase power using enhanced open-loop or closed-loop power control) for an uplink transmission. The uplink transmission may overlap in time (e.g., and frequency) with a scheduled uplink transmission from another UE to a same base station. For example, the uplink transmission may include one or more repetitions, where at least one of the repetitions may overlap with the scheduled uplink transmission. In order to reduce power consumption at the UE, the base station and the UE may employ a power-boosting scheme, where the UE may apply power-boosting to one or more specific symbols or resources (e.g., repetitions or slots) of the uplink transmission, where the remaining symbols or resources are not power boosted.

In a first example, the base station may configure the UE to apply power-boosting to all repetitions of the uplink transmission (e.g., without applying the power-boosting to previous or subsequent uplink transmissions). In a second example, the base station may configure the UE to apply power-boosting over specific slots or to specific repetitions of the uplink transmission. In a third example, the base station may configure the UE (e.g., semi-statically or dynamically) to perform power-boosting if the uplink transmission occupies one slot or includes one repetition. The base station may configure the UE semi-statically or dynamically to apply power-boosting to all repetitions, to apply power-boosting on a slot basis, or to apply power-boosting on a repetition basis. For example, the base station may semi-statically indicate for the UE to apply power-boosting to a first repetition or over a first slot of the uplink transmission. Additionally or alternatively, the base station may indicate specific repetitions or slots for power-boosting in an uplink grant associated with the uplink transmission (e.g., control information including the uplink grant). In some examples, the indication may be provided via a bit map. In one or more of the examples described herein, the base station may configure the UE to perform power-boosting for repetitions that correspond to a predefined spatial configuration, which may include one or more transmission reception points (TRPs), panels, beams, and/or precoders.

The UE may transmit the uplink transmission (e.g., including one or more repetitions) to the base station based on the power-boosting configuration indicated by the base station. The base station may receive the one or more repetitions of the uplink transmission and may combine the one or more repetitions to form a combined uplink signal. The power-boosting configuration may improve signal reception of the uplink transmission at the base station, such that the base station may receive the one or more repetitions and may decode the uplink transmission based on the one or more repetitions.

A method of wireless communication at a UE is described. The method may include receiving, from a base station, a control signal identifying resources allocated for an uplink transmission of data and a first power level associated with the uplink transmission, the first power level greater than a second power level configured for uplink transmissions, determining, based on the control signal, a set of the allocated resources for which the UE is to transmit the uplink transmission according to the first power level, and transmitting the uplink transmission of the data on the set of the allocated resources according to the first power level.

An apparatus for wireless communication at a UE is described. The apparatus may include a processor, memory coupled with the processor, and instructions stored in the memory. The instructions may be executable by the processor to cause the apparatus to receive, from a base station, a control signal identifying resources allocated for an uplink transmission of data and a first power level associated with the uplink transmission, the first power level greater than a second power level configured for uplink transmissions, determine, based on the control signal, a set of the allocated resources for which the UE is to transmit the uplink transmission according to the first power level, and transmit the uplink transmission of the data on the set of the allocated resources according to the first power level.

Another apparatus for wireless communication at a UE is described. The apparatus may include means for receiving, from a base station, a control signal identifying resources allocated for an uplink transmission of data and a first power level associated with the uplink transmission, the first power level greater than a second power level configured for uplink transmissions, determining, based on the control signal, a set of the allocated resources for which the UE is to transmit the uplink transmission according to the first power level, and transmitting the uplink transmission of the data on the set of the allocated resources according to the first power level.

A non-transitory computer-readable medium storing code for wireless communication at a UE is described. The code may include instructions executable by a processor to receive, from a base station, a control signal identifying resources allocated for an uplink transmission of data and a first power level associated with the uplink transmission, the first power level greater than a second power level configured for uplink transmissions, determine, based on the control signal, a set of the allocated resources for which the UE is to transmit the uplink transmission according to the first power level, and transmit the uplink transmission of the data on the set of the allocated resources according to the first power level.

Some examples of the method, apparatuses, and non-transitory computer-readable medium described herein may further include operations, features, means, or instructions for determining, based on the control signal, a second set of the allocated resources for which the UE may be to transmit the uplink transmission according to the second power level, and transmitting the uplink transmission of the data on the second set of the allocated resources according to the second power level.

In some examples of the method, apparatuses, and non-transitory computer-readable medium described herein, the control signal includes a command for the UE to use the first power level for the set of the allocated resources.

In some examples of the method, apparatuses, and non-transitory computer-readable medium described herein, determining the set of the allocated resources may include operations, features, means, or instructions for identifying resources of the allocated resources that may be within a first slot of a set of slots for the uplink transmission, where the set of the allocated resources correspond to the identified resources.

Some examples of the method, apparatuses, and non-transitory computer-readable medium described herein may further include operations, features, means, or instructions for receiving, from the base station, an indication of the set of the allocated resources.

In some examples of the method, apparatuses, and non-transitory computer-readable medium described herein, determining the set of the allocated resources may include operations, features, means, or instructions for identifying that the data may be to be transmitted using a set of repetitions on the allocated resources, the set of repetitions including a first repetition and one or more subsequent repetitions, and determining the set of the allocated resources corresponding to symbols of the first repetition.

In some examples of the method, apparatuses, and non-transitory computer-readable medium described herein, determining the set of the allocated resources may include operations, features, means, or instructions for identifying that the data may be to be transmitted using a set of repetitions on the allocated resources, receiving, from the base station, an indication of one or more repetitions of the set of repetitions for which the UE may be to use the first power level, and determining the set of the allocated resources corresponding to symbols of the one or more repetitions.

Some examples of the method, apparatuses, and non-transitory computer-readable medium described herein may further include operations, features, means, or instructions for receiving an indicator of one of a set of increased transmit power modes for the UE.

In some examples of the method, apparatuses, and non-transitory computer-readable medium described herein, a first of the set of increased transmit power modes indicates that the UE may be to transmit the uplink transmission according to the first power level for a subset of slots of the uplink transmission, a second of the set of increased transmit power modes indicates that the UE may be to transmit the uplink transmission according to the first power level for all the slots of the uplink transmission, and a third of the set of increased transmit power modes indicates that the UE may be to transmit the uplink transmission according to the first power level for a subset of repetitions of the uplink transmission.

In some examples of the method, apparatuses, and non-transitory computer-readable medium described herein, the control signal includes an indication that data repetition may be disabled on the allocated resources identified by the control signal.

In some examples of the method, apparatuses, and non-transitory computer-readable medium described herein, the control signal includes an indication that data repetition may be enabled on the allocated resources identified by the control signal, the set of the allocated resources for which the UE may be to transmit the uplink transmission according to the first power level may be further determined based on the indication that data repetition may be enabled.

Some examples of the method, apparatuses, and non-transitory computer-readable medium described herein may further include operations, features, means, or instructions for identifying that the data may be to be transmitted using a set of repetitions on the allocated resources, a first set of the set of repetitions to be transmitted according to a first spatial configuration and a second set of the set of repetitions to be transmitted according to a second spatial configuration, where the set of the allocated resources may be associated with the first spatial configuration.

In some examples of the method, apparatuses, and non-transitory computer-readable medium described herein, the control signal includes an indication that the UE may be to use the first power level for the uplink transmission for the first spatial configuration.

In some examples of the method, apparatuses, and non-transitory computer-readable medium described herein, determining the set of the allocated resources may include operations, features, means, or instructions for determining that the first set of the set of repetitions to be transmitted according to the first spatial configuration includes a first repetition of the set of repetitions, and determining to use the first power level for the uplink transmission for the first spatial configuration based on the first repetition being transmitted according to the first spatial configuration.

In some examples of the method, apparatuses, and non-transitory computer-readable medium described herein, the set of the allocated resources corresponds to all the resources allocated for the uplink transmission of data A method of wireless communication at a base station is described. The method may include identifying first data to be transmitted by a first UE, identifying symbols on which at least one second UE is to transmit second data, determining resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmitting, to the first UE, a control signal identifying the allocated resources, the first power level associated with the uplink transmission, and the set of the allocated resources on which the first UE is to transmit the uplink transmission according to the first power level.

An apparatus for wireless communication at a base station is described. The apparatus may include a processor, memory coupled with the processor, and instructions stored in the memory. The instructions may be executable by the processor to cause the apparatus to identify first data to be transmitted by a first UE, identify symbols on which at least one second UE is to transmit second data, determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmit, to the first UE, a control signal identifying the allocated resources, the first power level associated with the uplink transmission, and the set of the allocated resources on which the first UE is to transmit the uplink transmission according to the first power level.

Another apparatus for wireless communication at a base station is described. The apparatus may include means for identifying first data to be transmitted by a first UE, identifying symbols on which at least one second UE is to transmit second data, determining resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmitting, to the first UE, a control signal identifying the allocated resources, the first power level associated with the uplink transmission, and the set of the allocated resources on which the first UE is to transmit the uplink transmission according to the first power level.

A non-transitory computer-readable medium storing code for wireless communication at a base station is described. The code may include instructions executable by a processor to identify first data to be transmitted by a first UE, identify symbols on which at least one second UE is to transmit second data, determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmit, to the first UE, a control signal identifying the allocated resources, the first power level associated with the uplink transmission, and the set of the allocated resources on which the first UE is to transmit the uplink transmission according to the first power level.

Some examples of the method, apparatuses, and non-transitory computer-readable medium described herein may further include operations, features, means, or instructions for determining a second set of the allocated resources for the first UE to transmit the uplink transmission according to a third power level less than the first power level, and identifying, via the control signal, the second set of the allocated resources on which the first UE may be to transmit the uplink transmission according to the second power level.

In some examples of the method, apparatuses, and non-transitory computer-readable medium described herein, the control signal includes a command for the first UE to use the first power level for the set of the allocated resources.

In some examples of the method, apparatuses, and non-transitory computer-readable medium described herein, determining the allocated resources may include operations, features, means, or instructions for identifying symbols of the allocated resources that may be within a first slot of a set of slots for the uplink transmission, where the set of allocated resources correspond to the symbols within the first slot.

Some examples of the method, apparatuses, and non-transitory computer-readable medium described herein may further include operations, features, means, or instructions for transmitting, to the first UE, an indication of the set of the allocated resources.

In some examples of the method, apparatuses, and non-transitory computer-readable medium described herein, determining the allocated resources may include operations, features, means, or instructions for identifying that the first data may be to be transmitted by the first UE using a set of repetitions on the allocated resources, the set of repetitions including a first repetition and one or more subsequent repetitions, and determining the set of the allocated resources corresponding to symbols of the first repetition.

In some examples of the method, apparatuses, and non-transitory computer-readable medium described herein, determining the allocated resources may include operations, features, means, or instructions for identifying that the first data may be to be transmitted by the first UE using a set of repetitions on the allocated resources, transmitting, to the first UE, an indication of one or more repetitions of the set of repetitions for which the first UE may be to use the first power level, and determining the set of the allocated resources corresponding to symbols of the one or more repetitions.

Some examples of the method, apparatuses, and non-transitory computer-readable medium described herein may further include operations, features, means, or instructions for transmitting an indicator of one of a set of increased transmit power modes for the first UE.

In some examples of the method, apparatuses, and non-transitory computer-readable medium described herein, a first of the set of increased transmit power modes indicates that the first UE may be to transmit the uplink transmission according to the first power level for a subset of slots of the uplink transmission, a second of the set of increased transmit power modes indicates that the first UE may be to transmit the uplink transmission according to the first power level for all the slots of the uplink transmission, and a third of the set of increased transmit power modes indicates that the first UE may be to transmit the uplink transmission according to the first power level for a subset of repetitions of the uplink transmission.

In some examples of the method, apparatuses, and non-transitory computer-readable medium described herein, the control signal further includes an indication that data repetition may be enabled on the allocated resources identified by the control signal, the set of the allocated resources for which the first UE may be to transmit the uplink transmission according to the first power level may be further determined based on the indication that data repetition may be enabled.

Some examples of the method, apparatuses, and non-transitory computer-readable medium described herein may further include operations, features, means, or instructions for identifying that the first data may be to be transmitted using a set of repetitions on the allocated resources, a first set of the set of repetitions to be transmitted according to a first spatial configuration and a second set of the set of repetitions to be transmitted according to a second spatial configuration, where the set of the allocated resources may be associated with the first spatial configuration.

In some examples of the method, apparatuses, and non-transitory computer-readable medium described herein, the control signal includes an indication that the first UE may be to use the first power level for the uplink transmission for the first spatial configuration.

In some examples of the method, apparatuses, and non-transitory computer-readable medium described herein, determining the allocated resources may include operations, features, means, or instructions for determining that the first set of the set of repetitions to be transmitted according to the first spatial configuration includes a first repetition of the set of repetitions, and determining to use the first power level for the uplink transmission for the first spatial configuration based on the first repetition being transmitted according to the first spatial configuration.

DETAILED DESCRIPTION

Figure 1:
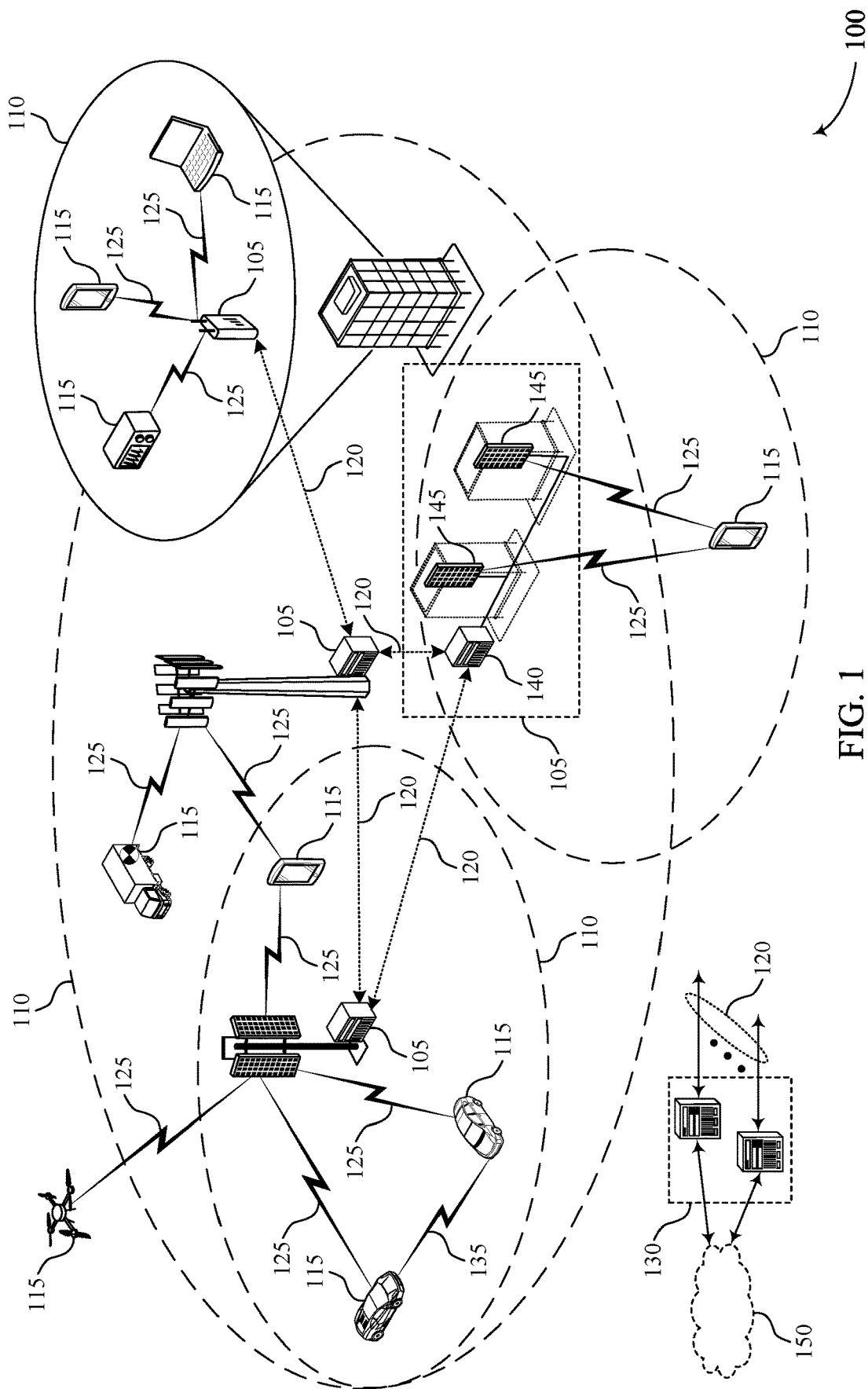
FIG. 1 illustrates an example of a wireless communications system that supports power-boosting design for multi-slot shared channels in accordance with aspects of the present disclosure.

Transmissions from one or more user equipments (UEs) to a base station may support service types that have different reliability and/or latency. For example, an uplink transmission from a first UE to a base station may correspond to a high throughput service, and an uplink transmission from a second UE to the base station may correspond to a service having low latency and/or high reliability. In some cases, uplink transmissions corresponding to different services and from different UEs may be dynamically multiplexed in one or more transmission resources (e.g., time-frequency resources). For example, the base station may transmit an uplink grant to the second UE to schedule an uplink transmission, where the uplink transmission may occupy a same set of transmission resources (e.g., or subset of transmission resources) as a previously-scheduled transmission from the first UE. While the examples herein describe different services for uplink transmissions from different UEs, it is to be understood that the same examples may apply to uplink transmissions associated with a same service. Similarly, the examples described herein may apply to various types of services and are not limited to a specific type of service or a priority associated therewith.

In some cases, the uplink transmission may include a multi-slot transmission or a transmission with one or more repetitions. For example, the base station may schedule multiple repetitions of an uplink transmission in order to accumulate power from the multiple repetitions and improve decoding (e.g., and support a predefined reliability). As described herein, an uplink transmission having one repetition may refer to an uplink transmission that includes one transmission instance, while an uplink transmission having multiple repetitions may refer to an uplink transmission having more than one transmission instance. In some examples, the uplink transmission may be scheduled to repeat in a predefined number of slots or may be scheduled to repeat on a symbol, sub-slot, or mini-slot basis. In some cases, one or more portions or repetitions of the uplink transmission may overlap (e.g., be multiplexed in time-frequency resources) with the scheduled uplink transmission corresponding to the first UE.

In such cases (e.g., in order to support a reliability corresponding to the uplink transmission), the base station may indicate for the second UE to perform power-boosting for the uplink transmission (e.g., increase transmission power using enhanced open-loop or closed-loop power control). For example, the base station may transmit a transmit power control (TPC) command to the second UE, indicating a new transmit power for uplink transmissions until a new TPC command is transmitted. As such, the second UE may boost power for all subsequent uplink transmissions, including one or more uplink transmissions that do not overlap with previously-scheduled uplink transmissions from other UEs. In order to reduce power consumption at the second UE resulting from such power-boosting, the base station and the second UE may employ a power-boosting scheme where power-boosting is applied to one or more symbols (e.g., repetitions or slots) of the uplink transmission, and not applied to other symbols (e.g., repetitions or slots) of the uplink transmission or other uplink transmissions.

In a first example, the base station may configure the UE to apply power-boosting to all repetitions of the uplink transmission (e.g., without applying the power-boosting to previous or subsequent uplink transmissions). In a second example, the base station may configure the UE to apply power-boosting over specific slots (e.g., transmission time intervals (TTIs)) or to specific repetitions corresponding to the uplink transmission. In a third example, the base station may configure the UE (e.g., semi-statically or dynamically) to perform power-boosting if the uplink transmission occupies one slot or includes one repetition. The base station may configure the UE semi-statically or dynamically to apply power-boosting to all repetitions, to apply power-boosting on a per-slot basis (e.g., per-TTI basis), or to apply power-boosting on a per-repetition basis. For example, the base station may semi-statically indicate for the UE to apply power-boosting to a first repetition or over a first slot (e.g., TTI) of the uplink transmission. Additionally or alternatively, the base station may indicate specific repetitions or slots (e.g., TTIs) for power-boosting in an associated uplink grant (e.g., control information including the uplink grant), such as via a bit map.

In one or more of the examples described herein, the base station may configure the UE to perform power-boosting for repetitions that correspond to a predefined spatial configuration, which may include one or more transmission reception points (TRPs), panels, beams, and/or precoders. For example, the base station may configure the UE to perform power-boosting for repetitions that are associated with a same TRP, panel, beam, and/or precoder as a first repetition of the uplink transmission. Additionally or alternatively, the uplink grant (e.g., control information including the uplink grant) may indicate one or more TRPs, panels, beams, and/or precoders for performing power-boosting.

The UE may transmit the uplink transmission (e.g., including one or more repetitions) to the base station based on the power-boosting configuration indicated by the base station. The base station may receive the one or more repetitions of the uplink transmission and may combine the one or more repetitions to form a combined uplink signal. The power-boosting configuration may improve signal reception of the uplink transmission at the base station, such that the base station may receive the one or more repetitions and may decode the uplink transmission based on the one or more repetitions.

Aspects of the disclosure are initially described in the context of wireless communications systems. Aspects of the disclosure are further illustrated by and described with reference to power-boosting configurations, an additional wireless communications system, apparatus diagrams, system diagrams, and flowcharts that relate to power-boosting design for multi-slot shared channels.

FIG. 1 illustrates an example of a wireless communications system 100 that supports power-boosting design for multi-slot shared channels in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some wireless systems may support services that have different reliability and/or latency. For example, an eMBB service may support high throughput communications, while an ultra-reliable low-latency communication (URLLC) service may support low-latency and high-reliability communications. In some cases, transmissions corresponding to different services (e.g., eMBB and URLLC, eMBB and mMTC, or mMTC and URLLC) may be dynamically multiplexed in one or more transmission resources (e.g., time-frequency resources). In one example, a UE 115 may request to transmit uplink traffic (e.g., a URLLC transmission) to a base station 105, where the uplink traffic may have a higher priority than uplink transmissions (e.g., eMBB transmissions) currently scheduled to be transmitted to the base station 105 by other UEs 115. The base station 105 may support a low latency for the higher-priority transmission (e.g., URLLC transmission) by scheduling the requested uplink transmission on resources that may be at least partially allocated to currently-scheduled uplink transmissions (e.g., eMBB transmissions), for example, if no dedicated resources are available to schedule the higher-priority transmission. As such, the base station 105 may use one or more scheduling techniques to schedule the higher-priority transmission.

For example, the base station 105 may cancel one or more scheduled uplink transmissions and schedule the higher-priority transmission in the resources corresponding to the canceled transmission(s). The base station 105 may accordingly transmit an uplink preemption indication to one or more UEs 115 that were scheduled to transmit using the resources. Additionally or alternatively, the base station 105 may schedule the higher-priority transmission to occupy the same transmission resources as one or more scheduled uplink transmissions without canceling the scheduled uplink transmission(s). Because the different uplink transmissions may overlap and cause interference, the base station 105 may indicate for the UE 115 with the higher-priority transmission to use power boosting (e.g., using open-loop or closed-loop power control) for the higher-priority transmission. In some cases, the base station 105 and the UE 115 may employ a power-boosting scheme to apply power-boosting to specific symbols (e.g., repetitions or slots) of the higher-priority transmission.

In a first example, the base station 105 may configure the UE 115 to apply power-boosting to all repetitions of the higher-priority uplink transmission (e.g., without applying the power-boosting to previous or subsequent uplink transmissions). In a second example, the base station 105 may configure the UE 115 to apply power-boosting over specific slots or to specific repetitions corresponding to the higher-priority uplink transmission. In a third example, the base station 105 may configure the UE 115 (e.g., semi-statically or dynamically) to apply power-boosting if the higher-priority uplink transmission occupies one slot or has one repetition. The base station 105 may configure the UE 115 semi-statically or dynamically to apply power-boosting to all repetitions, to apply power-boosting on a slot basis, or to apply power-boosting on a repetition basis. For example, the base station 105 may semi-statically indicate for the UE 115 to apply power-boosting to a first repetition or over a first slot of the higher-priority uplink transmission. Additionally or alternatively, the base station 105 may indicate specific repetitions or slots for power-boosting in the uplink grant (e.g., control information including the uplink grant), such as via a bit map. In one or more of the examples described herein, the base station 105 may configure the UE 115 to perform power-boosting for repetitions that correspond to a predefined TRP, panel, beam, and/or precoder.

The UE 115 may transmit the higher-priority uplink transmission (e.g., including one or more repetitions) to the base station 105 based on the power-boosting configuration indicated by the base station 105. The base station 105 may receive the one or more repetitions of the higher-priority uplink transmission and may combine the one or more repetitions to form a combined uplink signal. The power-boosting configuration may improve signal reception and decoding of the higher-priority uplink transmission at the base station 105.

Figure 2:
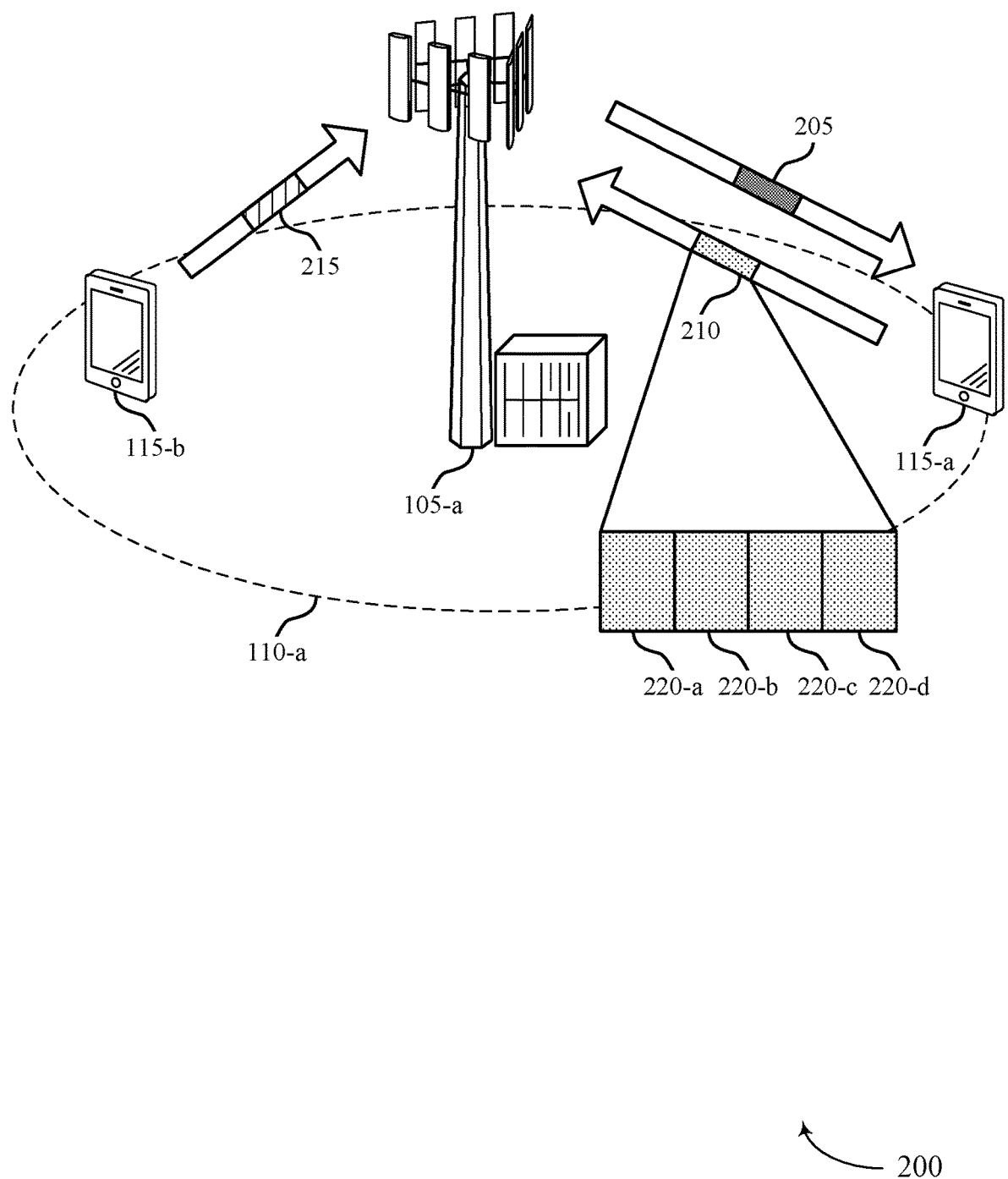
FIG. 2 illustrates an example of a wireless communications system that supports power-boosting design for multi-slot shared channels in accordance with aspects of the present disclosure.

FIG. 2 illustrates an example of a wireless communications system 200 that supports power-boosting design for multi-slot shared channels in accordance with aspects of the present disclosure. In some examples, wireless communications system 200 may implement aspects of wireless communication system 100. Wireless communications system 200 may include a base station 105-a and UEs 115-a and 115-b, which may be examples of a base station 105 and UEs 115 described with reference to FIG. 1. In some cases, uplink transmissions from UEs 115-a and 115-b to base station 105-a (e.g., over a physical uplink shared channel (PUSCH)) may support service types (e.g., one or more of URLLC, eMBB, or mMTC) that have different reliability and/or latency. For example, an uplink transmission 215 from UE 115-b to base station 105-a may correspond to a high throughput service (e.g., an eMBB service), and an uplink transmission 210 from UE 115-a to base station 105-a may correspond to a service having low latency and high reliability (e.g., a URLLC service).

In some cases, uplink transmissions from different UEs 115 and corresponding to different services (e.g., two or more of eMBB, URLLC, and mMTC services) may be dynamically multiplexed in one or more transmission resources (e.g., time-frequency resources). For example, base station 105-a may transmit a downlink control information (DCI) 205 including an uplink grant to UE 115-a to schedule uplink transmission 210 (e.g., a higher-priority transmission), where the uplink transmission 210 may at least partially occupy a same set of transmission resources as uplink transmission 215 (e.g., a previously-scheduled transmission). The set of transmission resources for uplink transmission 210 may include same time resources or same time and frequency resources as uplink transmission 215. While the examples herein describe different services for uplink transmissions 210 and 215, it is to be understood that the same examples may apply to uplink transmissions 210 and 215 associated with a same service.

In some cases, uplink transmission 210 may include a multi-slot transmission (e.g., multi-TTI transmission) or a transmission with one or more repetitions 220. For example, base station 105-a may schedule transmissions from UEs 115 (e.g., UE 115-a) on an edge or boundary of a coverage area 110-a (e.g., on a cell edge) such that the transmissions may include multiple repetitions 220, for example, in order to accumulate power from the multiple repetitions 220 and improve decoding at base station 105-a. As described herein, an uplink transmission 210 having one repetition 220 may refer to an uplink transmission 210 that includes one transmission instance, while an uplink transmission 210 having multiple repetitions 220 may refer to an uplink transmission 210 having more than one transmission instance. In some examples, uplink transmission 210 may be scheduled to repeat in a predefined number of slots (e.g., with one repetition 220 per slot). Additionally or alternatively, uplink transmission 210 may be scheduled to repeat on a sub-slot or mini-slot basis, where two or more repetitions 220 may fall in a same slot and/or where a single transmission repetition 220 may occur across a slot boundary (e.g., may occupy portions of two slots).

In some cases, uplink transmission 210 (e.g., symbols corresponding to one or more repetitions 220 or portions of uplink transmission 210) may overlap with uplink transmission 215. As described herein, overlapping transmissions may refer to transmissions that are scheduled on same time and frequency resources or on same time resources. For example, uplink transmission 210 may be scheduled on same time and frequency resources as uplink transmission 215. In such cases, in order to support a reliability corresponding to uplink transmission 210, base station 105-*a* may indicate for UE 115-*a* to use power-boosting (e.g., increase transmission power using enhanced open-loop or closed-loop power control) for uplink transmission 210 (e.g., in order to reduce interference effects). In order to reduce power consumption at UE 115-*a*, base station 105-*a* and the UE 115-*a* may employ a power-boosting scheme to perform power-boosting for one or more specific symbols (e.g., repetitions 220 or slots) of uplink transmission 210.

In a first example, base station 105-*a* may configure UE 115-*a* to apply power-boosting to all repetitions 220 of uplink transmission 210 (e.g., repetitions 220-*a*, 220-*b*, 220-*c*, and 220-*d*). Base station 105-*a* may configure UE 115-*a* semi-statically (e.g., via radio resource control (RRC) signaling or a media access control (MAC) control element (CE)) or dynamically (e.g., via a DCI, such as DCI 205) to apply the power-boosting to all repetitions 220 of uplink transmission 210. In some cases, UE 115-*a* may apply the power-boosting to all repetitions 220 of uplink transmission 210 without applying the power-boosting to previous or subsequent uplink transmissions (e.g., other URLLC transmissions or eMBB transmissions).

In a second example, base station 105-*a* may configure UE 115-*a* to apply power-boosting over specific slots or repetitions 220 corresponding to uplink transmission 210. Base station 105-*a* may configure UE 115-*a* semi-statically (e.g., via RRC signaling or a MAC CE) or dynamically (e.g., via a DCI, such as DCI 205) to apply the power-boosting on a slot or repetition basis. For example, base station 105-*a* may semi-statically indicate (e.g., via RRC signaling) for UE 115-*a* to apply power-boosting to a first repetition 220-*a* or to repetitions 220 within a first slot corresponding to uplink transmission 210. In some cases, a semi-static configuration may indicate whether to apply power-boosting to all repetitions 220, to apply power-boosting on a slot basis, or to apply power-boosting on a repetition basis. Additionally or alternatively, base station 105-*a* may dynamically indicate (e.g., via a DCI, such as DCI 205) specific slots or repetitions 220 over which UE 115-*a* is to apply power-boosting. For example, base station 105-*a* may indicate the specific slots or repetitions 220 in DCI 205 via a bit map having a bit-width equal to a maximum number of slots or a maximum number of repetitions 220 corresponding to the uplink transmission 210. The bit-width of the bit map may be explicitly configured (e.g., signaled to UE 115-*a* by base station 105-*a*) or may be determined implicitly by UE 115-*a* (e.g., based on a number of repetitions 220, a maximum number of slots, an MCS, a frequency band, or the like).

In a third example, base station 105-*a* may configure UE 115-*a* to apply power-boosting if uplink transmission 210 occupies one slot or has one repetition 220, such that UE 115-*a* may not otherwise applying power-boosting to uplink transmission 210. In some cases, base station 105-*a* may configure UE 115-*a* to perform this type of power-boosting if UE 115-*a* is on an edge of coverage area 110-*a* and may not have a power headroom to boost transmission power. Base station 105-*a* may configure UE 115-*a* semi-statically (e.g., via RRC signaling or a MAC CE) or dynamically (e.g., via a DCI, such as DCI 205) with this power-boosting configuration.

For example, base station 105-*a* may semi-statically indicate (e.g., via RRC signaling) a parameter including an aggregation factor (e.g., a number of repetitions 220) for uplink transmissions 210. Accordingly, UE 115-*a* may determine to apply power-boosting to uplink transmission 210 if the aggregation factor indicates that the uplink transmission 210 does not have multiple repetitions 220. Additionally or alternatively, base station 105-*a* may dynamically indicate (e.g., via a DCI, such as DCI 205) the aggregation factor for uplink transmission 210, and UE 115-*a* may determine to apply power-boosting to uplink transmission 210 if the aggregation factor indicates that the uplink transmission 210 does not have multiple repetitions 220. In some cases, UE 115-*a* may not expect to be configured (e.g., dynamically or semi-statically configured) with an aggregation factor indicating multiple repetitions 220 for the uplink transmission 210 during a same time period that UE 115-*a* is configured to perform power-boosting. As such, UE 115-*a* may determine not to apply power-boosting to uplink transmission 210 if the aggregation factor (e.g., signaled dynamically or semi-statically) indicates that uplink transmission 210 has multiple repetitions 220.

In one or more of the examples described herein, UE 115-*a* may transmit uplink transmission 210 (e.g., repetitions 220 of uplink transmission 210) to multiple TRPs, and/or using multiple panels, beams, and/or precoders. As such, UE 115-*a* may also perform power-boosting for repetitions 220 that correspond to a predefined TRP, panel, beam, and/or precoder. In a first example, UE 115-*a* may implicitly determine to perform power-boosting for specific repetitions 220 of uplink transmission 210. For example, UE 115-*a* may perform power-boosting for repetitions 220 that are associated with a same TRP, panel, beam, and/or precoder as a first repetition 220-*a* of uplink transmission 210. Base station 105-*a* may indicate a TRP, panel, beam, or precoder of the first repetition 220-*a* via an SRS resource indicator (SRI) associated with the first repetition 220-*a*. The precoder may additionally or alternatively be indicated via a transmit precoding matrix indicator (TPMI) associated with the first repetition 220-*a*. In a second example, DCI 205 may indicate one or more TRPs, panels, beams, and/or precoders for performing power-boosting (e.g., via an SRI and/or TPMI). In some cases, DCI 205 may include multiple power-boosting fields (e.g., in a bit map) indicating whether to boost power for each TRP, panel, beam, and/or precoder (e.g., using an SRI and/or TPMI) associated with uplink transmission 210.

After being configured with a power-boosting configuration for uplink transmission 210, UE 115-*a* may transmit uplink transmission 210 (e.g., including one or more repetitions 220) to base station 105-*a* based on the configuration. Base station 105-*a* may receive the one or more repetitions 220 of uplink transmission 210 and may combine the one or more repetitions 220 to form a combined uplink signal. The power-boosting configuration may improve signal reception of uplink transmission 210 at base station 105-*a*, such that base station 105-*a* may receive the one or more repetitions 220 and may decode the uplink transmission 210 based on the one or more repetitions 220.

Figure 3A:
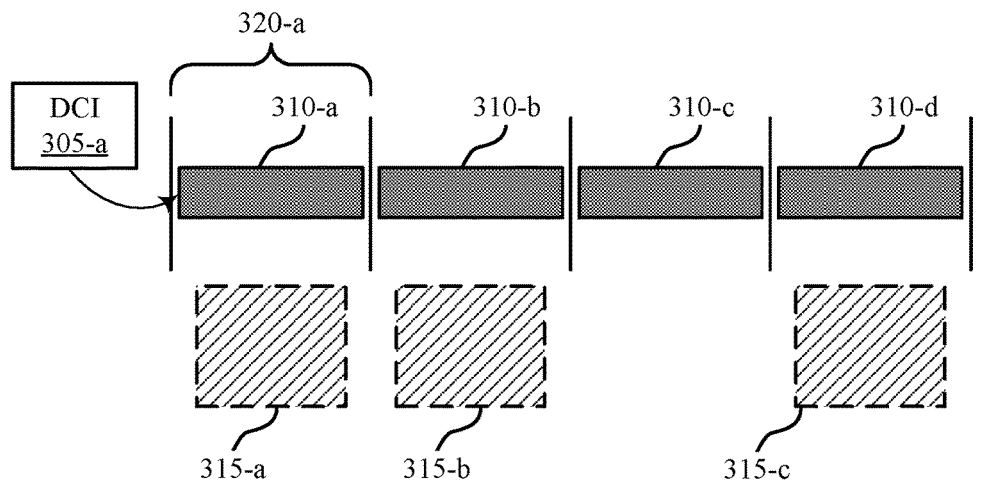
FIGS. 3A, 3B, and 3C illustrate examples of power-boosting configurations that support power-boosting design for multi-slot shared channels in accordance with aspects of the present disclosure.
Figure 3B:
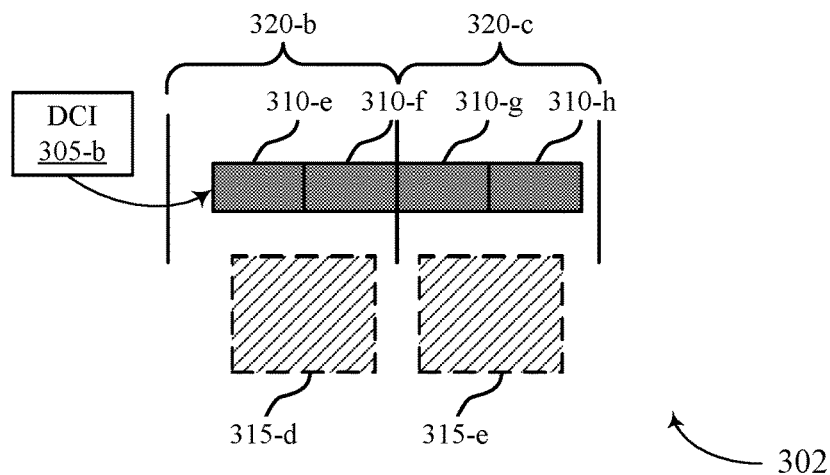
Figure 3C:
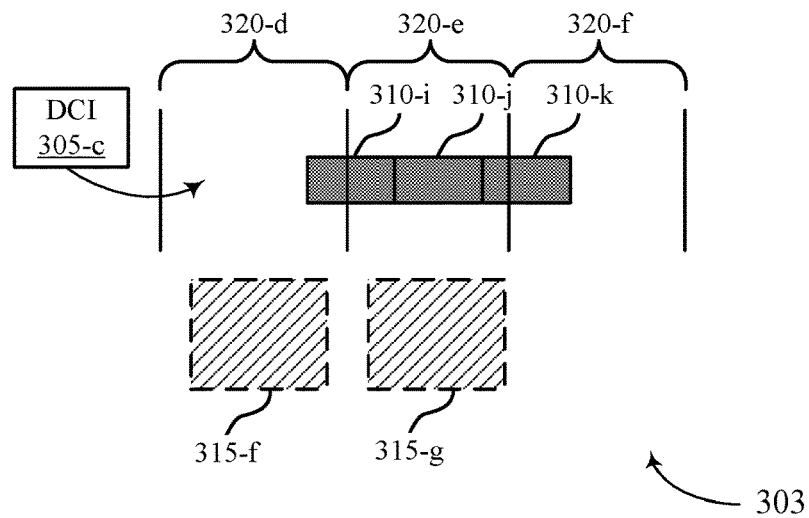

FIGS. 3A, 3B, and 3C illustrate examples of power-boosting configurations 301, 302, and 303 that support power-boosting design for multi-slot shared channels in accordance with aspects of the present disclosure. In some examples, power-boosting configurations 301, 302, and 303 may implement aspects of wireless communications systems 100 or 200. For example, a base station 105 may configure a UE 115 to operate according to power-boosting configuration 301, 302, or 303 when transmitting an uplink communication, such as a high-priority (e.g., URLLC) transmission. The UE 115 and the base station 105 may be examples of a UE 115 and a base station 105 described with reference to FIGS. 1 and 2. In some cases, the UE 115 may use power-boosting configuration 301, 302, or 303 to boost power for one or more uplink transmissions (e.g., one or more symbols corresponding to one or more repetitions or slots of an uplink transmission).

As described with reference to FIGS. 1 and 2, the base station 105 may configure the UE 115 to boost power for one or more predefined uplink transmissions (e.g., URLLC or other transmissions). For example, the base station 105 may transmit an uplink grant to the UE 115 via a DCI 305 (e.g., DCI 305-a, 305-b, or 305-c) to schedule an uplink transmission having one or more repetitions 310, where one or more of the transmission repetitions 310 may overlap (e.g., share time resources or time-frequency resources) with another transmission directed to the base station 105 (e.g., an overlapping transmission 315 from a different UE 115). As such, the base station 105 may configure the UE 115 to boost power on one or more of the transmission repetitions 310 in order to maintain a reliability of the uplink transmission (e.g., in order to reduce interference effects). The base station 105 may include a power-boosting command to the UE 115 in the DCI 305, where the power-boosting command may indicate (e.g., using one or more bits) whether to perform power-boosting for the uplink transmission corresponding to the DCI 305. For example, the base station 105 may indicate for the UE 115 to perform open-loop power control using one bit of the DCI 305 or may indicate for the UE 115 to perform closed-loop power control using multiple bits of the DCI 305, where the multiple bits may indicate a power control range. In some cases, the DCI 305 may include a format designated for specifying power-boosting commands.

In accordance with power-boosting configuration 301, the base station 105 may schedule the uplink transmission to repeat in a predefined number of slots 320 (e.g., including slot 320-a), with one repetition 310 per slot 320. Additionally or alternatively, the uplink transmission may be scheduled to repeat on a sub-slot or mini-slot basis, such as in power-boosting configurations 302 and 303. In such cases, portions of two or more repetitions 310 may fall in a same slot 320 or a single transmission repetition 310 may occur across a slot boundary (e.g., may occupy portions of two slots 320), as illustrated in power-boosting configurations 302 and 303, respectively. A different UE 115 may transmit any one or more of the overlapping transmissions 315 (e.g., eMBB transmissions) illustrated in FIG. 3A, 3B, or 3C, such that at least one overlapping transmission 315 may overlap with the uplink transmission. For example, one or more of uplink transmission repetitions 310-a through 310-d may overlap with one or more of overlapping transmissions 315-a through 315-c, one or more of uplink transmission repetitions 310-e through 310-h may overlap with one or both of overlapping transmissions 315-d and 315-e, and one or more of uplink transmission repetitions 310-i through 310-k may overlap with one or both of overlapping transmissions 315-f and 315-g.

In some cases, the uplink transmission (e.g., one or more repetitions 310 of the uplink transmission) may overlap with an overlapping transmission 315 in one or more other slots 320, without coinciding in one or more other slots 320. For example, overlapping transmission 315-a may overlap with uplink transmission repetition 310-a, but there may be no overlapping transmission 315 that overlaps with repetition 310-c. In another example, overlapping transmission 315-d may overlap with uplink transmission repetitions 310-e and 310-f in slot 320-b (e.g., portions of repetitions 310-e and 310-f), but there may be no overlapping transmission 315 that overlaps with repetitions 310-g and 310-h in slot 320-c. Similarly, overlapping transmissions 315-f and 315-g may overlap with the portions of uplink transmission repetitions 310-i, 310-j, and 310-k in slots 320-d and 320-e, but there may be no overlapping transmission 315 that overlaps with the portion of repetition 310-k within slot 320-f.

In accordance with power-boosting configurations 301, 302, and 303, the base station 105 may configure the UE 115 to apply power-boosting to all repetitions 310 of the uplink transmission. The UE 115 may apply power-boosting to repetitions 310 coinciding with overlapping transmissions 315 and to repetitions 310 that do not overlap with overlapping transmissions 315. For example, the UE 115 may apply power-boosting to all of uplink transmission repetitions 310-a through 310-d, 310-e through 310-h, or 310-i through 310-k, whether or not a respective repetition 310 overlaps with an overlapping transmission 315. The base station 105 may configure the UE 115 semi-statically (e.g., via RRC signaling or a MAC CE) or dynamically (e.g., via a DCI 305) to apply the power-boosting to all repetitions 310 of the uplink transmission. In some cases, the UE 115 may apply the power-boosting to all repetitions 310 of the uplink transmission without applying the power-boosting to previous or subsequent uplink transmissions (e.g., other URLLC transmissions or eMBB transmissions).

The UE 115 may transmit the uplink transmission (e.g., including one or more repetitions 310) to the base station 105 based on the power-boosting configuration. For example, the UE 115 may boost the power of each repetition 310 of the uplink transmission. The base station 105 may receive the one or more repetitions 310 of the uplink transmission and may combine the one or more repetitions 310 to form a combined uplink signal. The power-boosting configuration may improve signal reception of the uplink transmission at the base station 105, such that the base station 105 may receive the one or more repetitions 310 and may decode the uplink transmission based on the one or more repetitions 310.

Figure 4A:
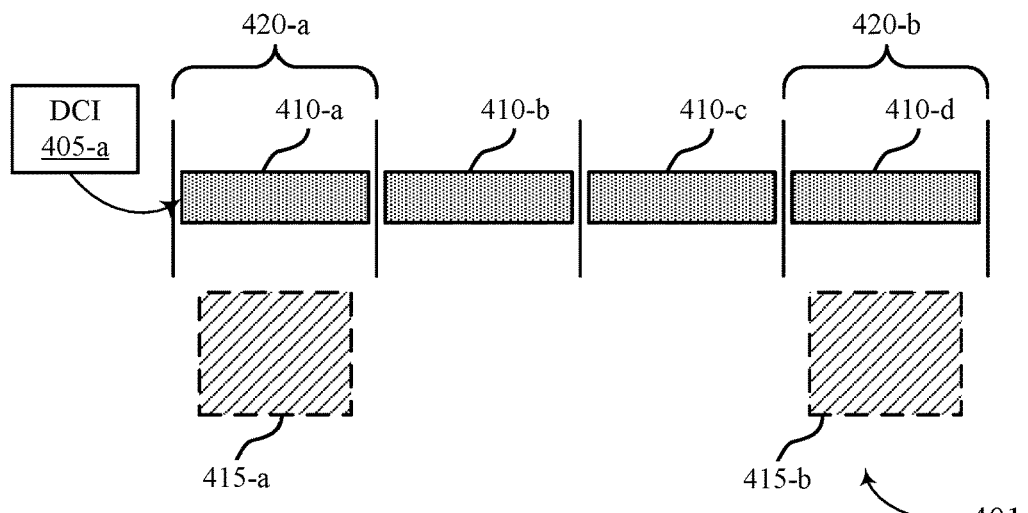
FIGS. 4A, 4B, and 4C illustrate examples of power-boosting configurations that support power-boosting design for multi-slot shared channels in accordance with aspects of the present disclosure.
Figure 4B:
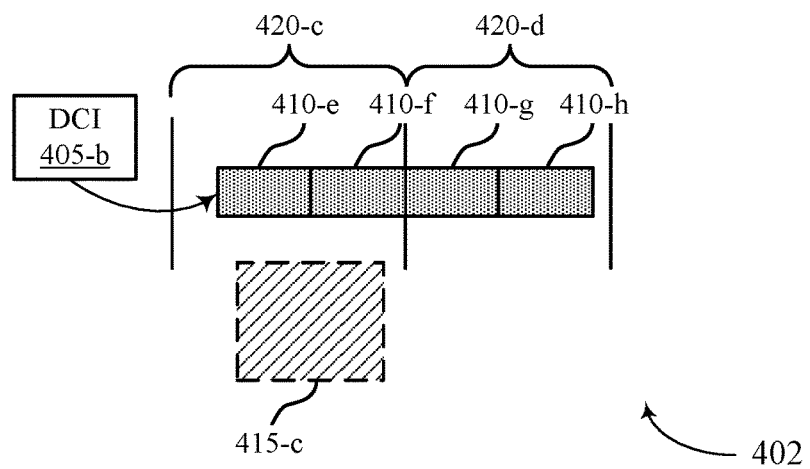
Figure 4C:
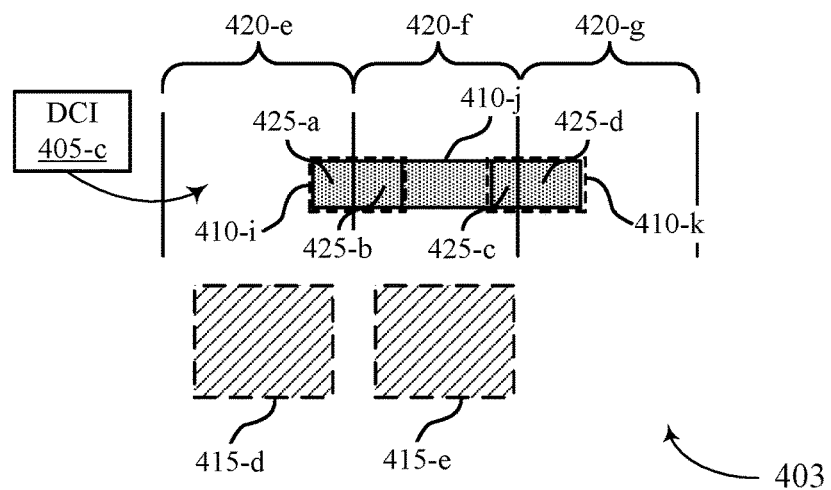
Figure 5A:
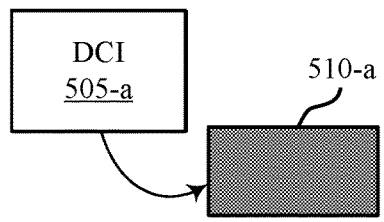
FIGS. 5A, 5B, 5C, and 5D illustrate examples of power-boosting configurations that support power-boosting design for multi-slot shared channels in accordance with aspects of the present disclosure.
Figure 5B:
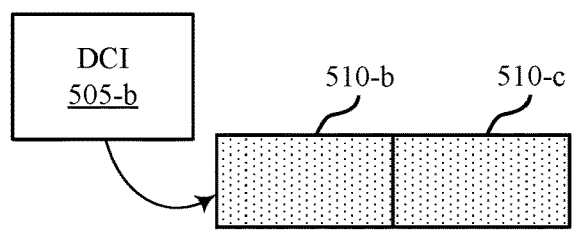
Figure 5C:
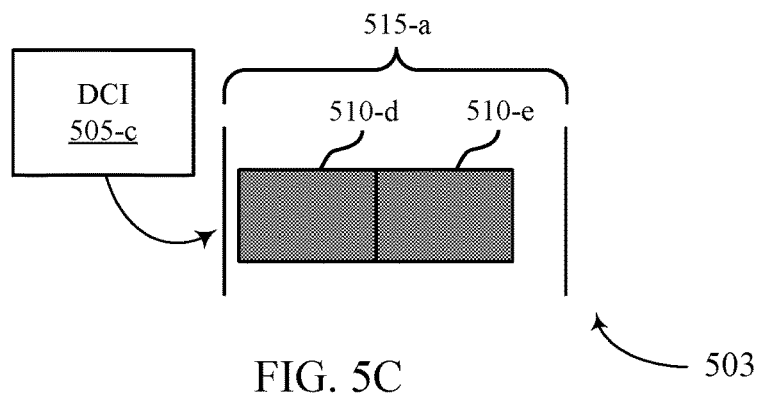
Figure 5D:
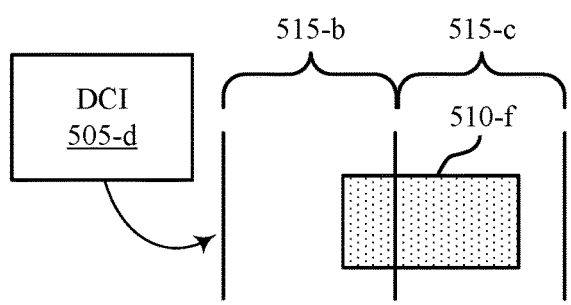

FIGS. 4A, 4B, and 4C illustrate examples of power-boosting configurations 401, 402, and 403 that support power-boosting design for multi-slot shared channels in accordance with aspects of the present disclosure. In some examples, power-boosting configurations 401, 402, and 403 may implement aspects of wireless communications systems 100 or 200. For example, a base station 105 may configure a UE 115 to operate according to power-boosting configuration 401, 402, or 403 when transmitting an uplink communication, such as a high-priority (e.g., URLLC) transmission. The UE 115 and the base station 105 may be examples of a UE 115 and a base station 105 described with reference to FIGS. 1-3. In some cases, the UE 115 may use power-boosting configuration 401, 402, or 403 to boost power for one or more uplink transmissions (e.g., one or more symbols including one or more repetitions or slots of an uplink transmission).

As described with reference to FIGS. 1-3, a base station 105 may configure a UE 115 to boost power for one or more predefined uplink transmissions (e.g., URLLC transmissions). For example, the base station 105 may transmit an uplink grant to the UE 115 via a DCI 405 (e.g., DCI 405-a, 405-b, or 405-c) to schedule an uplink transmission having one or more repetitions 410, where one or more of the transmission repetitions 410 may overlap with another transmission directed to the base station 105 (e.g., an overlapping transmission 415 from a different UE 115, such as an eMBB transmission). As such, the base station 105 may configure the UE 115 to boost power on one or more of the transmission repetitions 410 in order to maintain a reliability of the uplink transmission (e.g., in order to reduce interference effects). As described with reference to FIG. 3, the base station 105 may indicate a power-boosting command to the UE 115 in the DCI 405 (e.g., via one or more bits).

In accordance with power-boosting configuration 401, the base station 105 may schedule the uplink transmission to repeat in a predefined number of slots 420, with one repetition 410 per slot. Additionally or alternatively, the uplink transmission may be scheduled to repeat on a sub-slot or mini-slot basis, such as in power-boosting configurations 402 and 403 (e.g., such as in power-boosting configuration 402, where slots 420-c and 420-d each include two repetitions 410). In such cases, portions of two or more repetitions 410 may fall in a same slot 420 or a single transmission repetition 410 may occur across a slot boundary. For example, a first portion 425-a of a repetition 410-i may occupy part of slot 420-e and a second portion 425-b of repetition 410-i may occupy part of slot 420-f. Similarly, a first portion 425-c of a repetition 410-k may occupy part of slot 420-f and a second portion 425-d of repetition 410-k may occupy part of slot 420-g.

As described with reference to FIG. 3, one or more of uplink transmission repetitions 410-a through 410-d may overlap with one or both of overlapping transmissions 415-a and 415-b, one or more of uplink transmission repetitions 410-e through 410-h may overlap with overlapping transmission 415-c, and one or more of uplink transmission repetitions 410-i through 410-k may overlap with one or both of overlapping transmissions 415-d and 415-e. In some cases, as described with reference to FIG. 3, the uplink transmission (e.g., one or more repetitions 410 of the uplink transmission) may overlap with an overlapping transmission 415 in one or more slots 420, without coinciding in other slots 420.

In accordance with power-boosting configurations 401, 402, and 403, the base station 105 may configure the UE 115 to apply power-boosting over specific slots 420 corresponding to the uplink transmission. For example, the base station 105 may semi-statically indicate (e.g., via RRC signaling or a MAC CE) for the UE 115 to apply power-boosting to repetitions 410 within a first slot 420 corresponding to the uplink transmission (e.g., slot 420-a, 420-c, or 420-e). As such, the UE 115 may apply power-boosting to repetition 410-a, repetitions 410-e and 410-f, or portion 425-a of repetition 410-i. In some cases, the base station 105 may schedule (e.g., via the DCI 405) the first slot 420 of the uplink transmission to align with one or more overlapping transmissions 415, such that the UE may perform the power-boosting in a same slot 420 as an overlapping transmission 415. Additionally or alternatively, the base station 105 may dynamically indicate (e.g., via a bit map in the DCI 405) specific slots 420 over which the UE 115 is to apply power-boosting. For example, the base station 105 may indicate for the UE 115 to perform power-boosting over slots 420-a and 420-b (e.g., corresponding to repetitions 410-a and 410-d), over slot 420-c (e.g., corresponding to repetitions 410-e and 410-f), or over slots 420-e and 420-f (e.g., corresponding to repetitions 410-i, 410-j, and portion 425-c of repetition 410-k).

The base station 105 may indicate the specific slots 420 or repetitions 410 in a DCI 405 via a bit map having a bit-width equal to a maximum number of slots 420 or a maximum number of repetitions 410 corresponding to the uplink transmission. The bit-width of the bit map may be explicitly configured (e.g., via RRC signaling from the base station 105 to the UE 115) or may be determined implicitly by the UE 115 (e.g., based on a number of repetitions 410, a maximum number of slots 420, an MCS, a frequency band, or the like). For example, the UE 115 may determine the bit-width of the bitmap based on a number of repetitions 410 configured for the uplink transmission or the maximum number of repetitions 410 configured for the uplink transmission (e.g., if the number of repetitions 410 is indicated dynamically in the DCI 405).

Additionally or alternatively, the base station 105 may configure the UE 115 to apply power-boosting to specific repetitions 410 of the uplink transmission. For example, the base station 105 may semi-statically indicate (e.g., via RRC signaling or a MAC CE) for the UE 115 to apply power-boosting to a first repetition 410 of the uplink transmission. Accordingly, the UE 115 may apply power-boosting to repetition 410-a, 410-e, or 410-i. In some cases, the base station 105 may schedule the first repetition of the uplink transmission (e.g., via the DCI 405) to align with one or more overlapping transmissions 415, such that the UE may perform the power-boosting in a same slot 420 as an overlapping transmission 415. Additionally or alternatively, the base station 105 may dynamically indicate (e.g., via a bit map in the DCI 405) specific repetitions 410 for which the UE 115 is to apply power-boosting. For example, the base station 105 may indicate for the UE 115 to perform power-boosting for repetitions 410-a and 410-d, for repetitions 410-e and 410-f, or for repetitions 410-i, 410-j, and 410-k.

The UE 115 may transmit the uplink transmission (e.g., including one or more repetitions 410) to the base station 105 based on the power-boosting configuration. For example, the UE 115 may boost the power for the indicated slots 420 and/or the indicated repetitions 410 of the uplink transmission (e.g., based on the dynamic or the semi-static configuration). The base station 105 may receive the one or more repetitions 410 of the uplink transmission and may combine the repetitions 410 to form a combined uplink signal. The power-boosting configuration may improve signal reception of the uplink transmission at the base station 105, such that the base station 105 may receive the one or more repetitions 410 and may decode the uplink transmission based on the one or more repetitions 410.

FIGS. 5A, 5B, 5C, and 5D illustrate examples of power-boosting configurations 501, 502, 503, and 504 that support power-boosting design for multi-slot shared channels in accordance with aspects of the present disclosure. In some examples, power-boosting configurations 501, 502, 503, and 504 may implement aspects of wireless communications systems 100 or 200. For example, a base station 105 may configure a UE 115 to operate according to power-boosting configuration 501, 502, 503, or 504 when transmitting an uplink communication, such as a high-priority (e.g., URLLC) transmission. The UE 115 and the base station 105 may be examples of a UE 115 and a base station 105 described with reference to FIGS. 1-4. In some cases, the UE 115 may use power-boosting configuration 501, 502, 503, or 504 to boost power for one or more uplink transmissions (e.g., one or more symbols corresponding to one or more uplink transmissions).

As described with reference to FIGS. 1-4, a base station 105 may configure a UE 115 to boost power for one or more predefined uplink transmissions (e.g., URLLC transmissions). For example, the base station 105 may transmit an uplink grant to the UE 115 via a DCI 505 to schedule an uplink transmission having one or more repetitions 510, where one or more of the transmission repetitions 510 may overlap with another transmission directed to the base station 105 (e.g., an overlapping transmission from a different UE 115, such as an eMBB transmission). As such, the base station 105 may configure the UE 115 to determine whether to boost power on one or more of the transmission repetitions 510 in order to maintain a reliability for the uplink transmission. As described with reference to FIG. 3, the base station 105 may indicate a power-boosting command to the UE 115 in the DCI 505 (e.g., via one or more bits).

The base station 105 may configure the UE 115 such that the UE 115 may transmit uplink transmissions without power-boosting if the uplink transmissions occupy multiple slots 515 or include multiple repetitions 510. In a first example, the base station 105 may semi-statically configure a number of repetitions 510 (e.g., a repetition factor) for uplink transmissions (e.g., via an RRC parameter, such as pusch-AggregationFactor). If the semi-static configuration indicates that uplink transmissions are associated with multiple repetitions 510 or that uplink transmissions occur over multiple slots, the UE 115 may transmit the uplink transmissions without performing power-boosting. In such cases, the base station 105 may transmit DCI 505 without a power-boosting command or field (e.g., because power-boosting may not be performed for the uplink transmission).

In a second example, the base station 105 may dynamically indicate (e.g., via the DCI 505) a repetition factor or number of slots for an associated uplink transmission. In such cases, the base station 105 may include the power-boosting command or field in the DCI 505. If the dynamic configuration (e.g., indicated in the DCI 505) indicates that the associated uplink transmission is associated with multiple repetitions 510 or occurs over multiple slots, the UE 115 may transmit the uplink transmission without performing power-boosting. The UE 115 may apply power-boosting to uplink transmissions having one repetition 510 (e.g., having a repetition factor that is equal to 1), or to uplink transmissions that fall within a same slot. If either of these conditions is not met, the UE may not expect an uplink grant (e.g., in a DCI 505) indicating a power boost, and may ignore any power-boosting commands in a DCI 505.

For example, the UE 115 may receive DCI 505-a, 505-b, 505-c, or 505-d, where each DCI 505 may include an uplink grant. DCI 505-a may schedule a single uplink transmission repetition 510-a, DCI 505-b may schedule an uplink transmission having two repetitions 510-b and 510-c, DCI 505-c may schedule an uplink transmission having two repetitions 510-d and 510-e that occupy one slot 515-a, and DCI 505-d may schedule an uplink transmission repetition 510-f that spans portions of two slots 515-b and 515-c. The UE 115 may be configured to operate according to one of power-boosting configurations 501, 502, 503, or 504. Accordingly, the UE 115 may determine to perform power-boosting for repetition 510-a (e.g., because repetition 510-a represents a single repetition) or for repetitions 510-d and 510-e (e.g., because repetitions 510-d and 510-e fall within a single slot 515-a). The UE 115 may additionally or alternatively determine to transmit repetitions 510-b and 510-c without performing power-boosting (e.g., because repetitions 510-b and 510-c include more than one repetition), or to transmit repetition 510-f without performing power-boosting (e.g., because repetition 510-f may occupy portions of two slots 515-b and 515-c). The UE 115 may transmit the uplink transmission(s) (e.g., including the one or more repetitions 510) to the base station 105 based on the determination.

Figure 6:
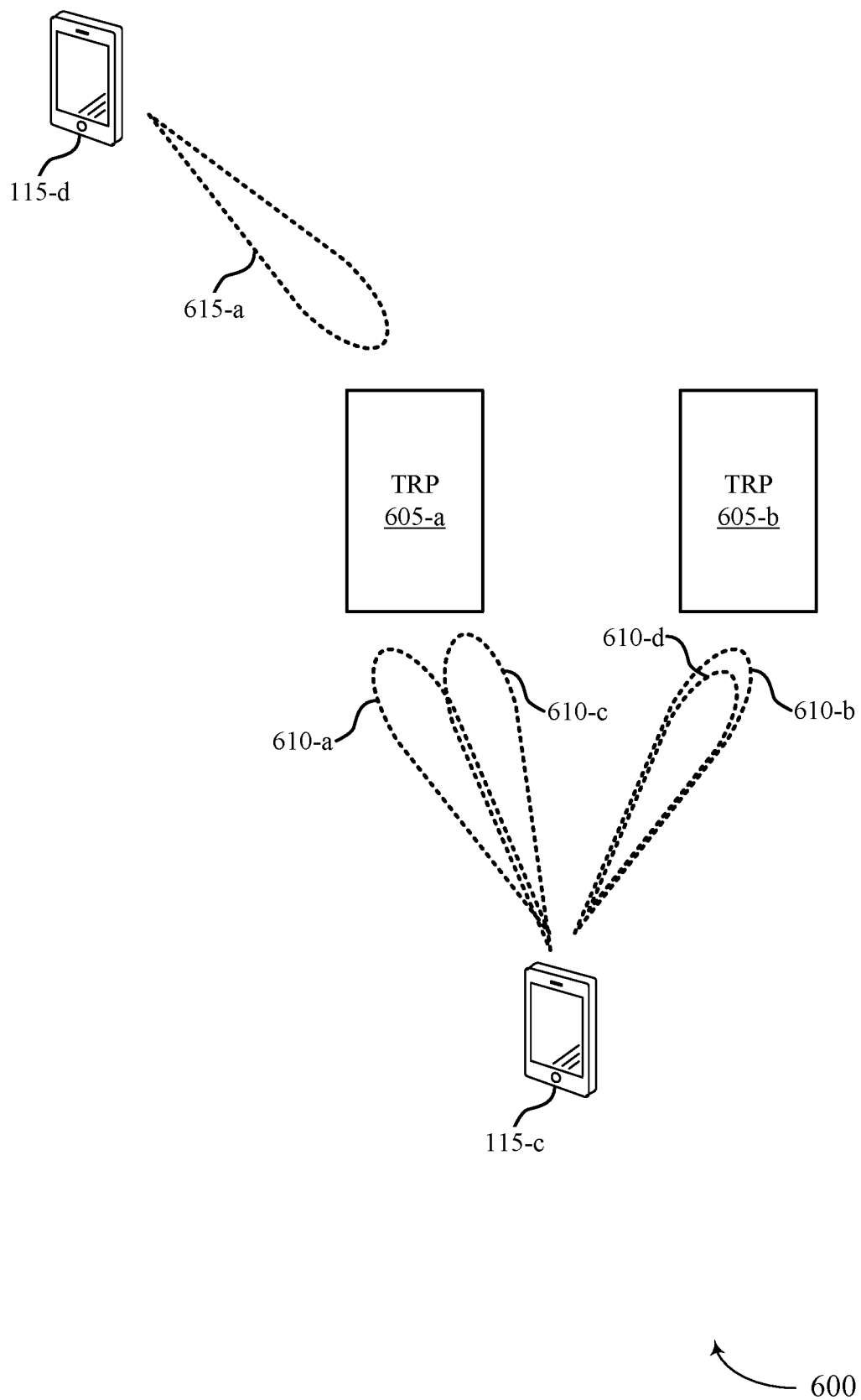
FIG. 6 illustrates an example of a wireless communications system that supports power-boosting design for multi-slot shared channels in accordance with aspects of the present disclosure.

FIG. 6 illustrates an example of a wireless communications system 600 that supports power-boosting design for multi-slot shared channels in accordance with aspects of the present disclosure. In some examples, wireless communications system 600 may implement aspects of wireless communications systems 100 or 200, as well as one or more of power-boosting configurations 301, 302, 303, 401, 402, 403, 501, 502, 503, and 504. For example, a base station 105 may configure a UE 115-c to operate according to a power-boosting configuration when transmitting an uplink communication, such as a high-priority (e.g., URLLC) transmission. The UE 115-c and the base station 105 may be examples of a UE 115 and a base station 105 described with reference to FIGS. 1-5. In some cases, UE 115-c may use the power-boosting configuration to boost power for one or more uplink transmissions (e.g., one or more symbols including one or more repetitions or slots of an uplink transmission).

For example, UE 115-c may transmit an uplink transmission (e.g., including two or more repetitions 610) using multiple spatial configurations, where a spatial configuration may include one or more TRPs 605, panels, beams, and/or precoders. A TRP 605 may correspond to a panel, a base station 105, a sector of a base station 105, a cell, etc. UE 115-c may perform power-boosting for repetitions 610 that target one or more predefined spatial configurations. In a first example, UE 115-c may implicitly determine to perform power-boosting for specific repetitions 610. For example, UE 115-c may perform power-boosting for repetitions 610 that are associated with a same spatial configuration as a first repetition 610-a of the uplink transmission. The spatial configuration (e.g., one or more TRPs 605, panels, beams, and/or precoders) corresponding to the first repetition 610-a may be identified via an SRI associated with the first repetition 610-a (e.g., may be indicated in a DCI associated with the uplink transmission or may be semi-statically configured via RRC signaling or a MAC CE). A precoder may additionally or alternatively be identified via a TPMI (e.g., associated with the first repetition 610-a). In a second example, a DCI associated with the uplink transmission may indicate (e.g., via an SRI and/or TPMI) one or more spatial configurations (e.g., one or more TRPs 605, panels, beams, and/or precoders) for performing power-boosting. In some cases, the DCI may include multiple power-boosting fields (e.g., in a bit map) indicating whether to boost power for each spatial configuration (e.g., identified using an SRI and/or TPMI).

In one example, UE 115-c may be configured to transmit repetitions 610-a and 610-c (e.g., first and third repetitions 610) to a transmission reception point (TRP) 605-a and transmit repetitions 610-b and 610-d (e.g., second and fourth repetitions 610) to a TRP 605-b. In some examples, repetitions 610-a and 610-c may correspond to different beams, while repetitions 610-b and 610-d may correspond to a same beam. At least partially overlapping in time or in time and frequency with one or more transmission repetitions 610, a UE 115-d may transmit an overlapping uplink transmission 615-a to TRP 605-a (e.g., that may interfere with one or more symbols of the uplink transmission from UE 115-c). Accordingly, a base station 105 associated with TRP 605-a may implicitly or explicitly indicate (e.g., using an identifying SRI) for UE 115-c to boost power for transmission repetitions 610 associated with TRP 605-a. UE 115-c may therefore boost power for repetitions 610-a and 610-c without boosting power for repetitions 610-b and 610-d. Additionally or alternatively, the base station 105 may indicate for UE 115-c to boost power for a specific beam (e.g., associated with repetition 610-*a*) directed to TRP 605-*a*. As such, UE 115-*c* may boost power for repetitions 610 associated with the indicated beam (e.g., repetition 610-*a*) without boosting power for other repetitions (e.g., repetitions 610-*b*, 610-*c*, and 610-*d*). The base station 105 may additionally or alternatively indicate (e.g., implicitly or explicitly indicate, using an SRI or TPMI) a panel and/or precoder associated with one or more repetitions 610 for which UE 115-*c* is to boost power.

The UE 115 may transmit the uplink transmission (e.g., including one or more repetitions 610) to the one or more TRPs 605 based on the power-boosting configuration. For example, the UE 115 may boost the power for the indicated spatial configuration(s) associated with the uplink transmission (e.g., based on the dynamic or the semi-static configuration). The power-boosting configuration may improve signal reception of the uplink transmission at a base station 105 associated with the indicated spatial configuration(s), such that the base station 105 may receive the one or more repetitions 610 and may decode the uplink transmission based on the one or more repetitions 610.

Figure 7:
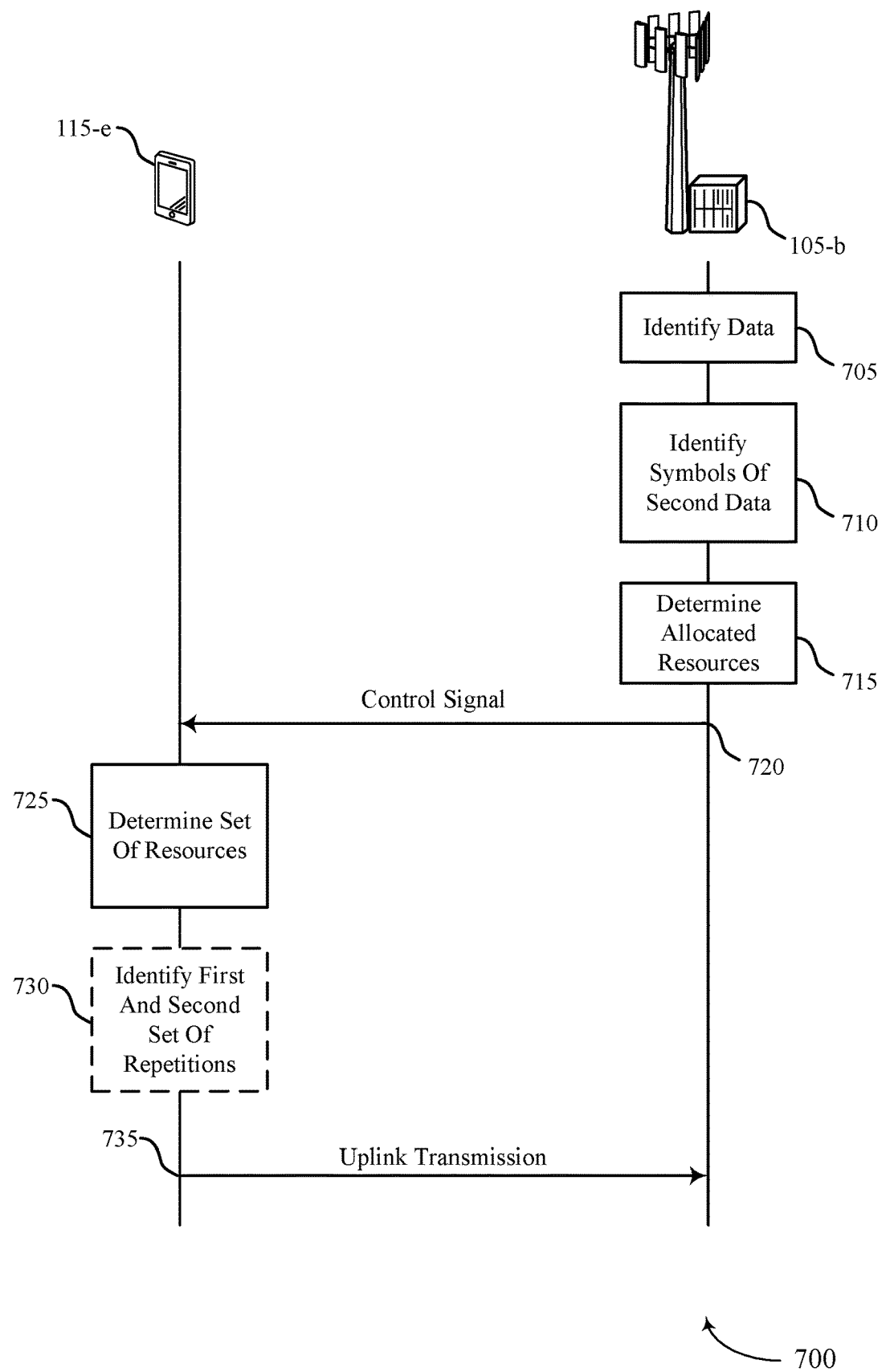
FIG. 7 illustrates an example of a process flow that supports power-boosting design for multi-slot shared channels in accordance with aspects of the present disclosure.

FIG. 7 illustrates an example of a process flow 700 that supports power-boosting design for multi-slot shared channels in accordance with aspects of the present disclosure. In some examples, process flow 700 may be implemented by, or relate to, aspects of wireless communications systems 100, 200, or 600. Process flow 700 may also implement aspects of one or more of power-boosting configurations 301, 302, 303, 401, 402, 403, 501, 502, 503, or 504. Process flow 700 may be implemented by a base station 105-*b* and/or a UE 115-*e*, which may be examples of a base station 105 and a UE 115 described with reference to FIGS. 1-6. In some cases, base station 105-*b* may configure UE 115-*e* to operate according to a power-boosting configuration for one or more uplink transmissions.

In the following description of the process flow 700, the operations between the UE 115-*e* and the base station 105-*b* may be transmitted in a different order than the order shown, or the operations performed by the base station 105-*b* or the UE 115-*e* may be performed in different orders or at different times. Some operations may also be left out of the process flow 700, or other operations may be added to the process flow 700. Although the base station 105-*b* and the UE 115-*e* are shown performing the operations of process flow 700, some aspects of some operations may also be performed by another wireless device.

At 705, base station 105-*b* may identify first data to be transmitted by UE 115-*e* (e.g., as part of an uplink transmission).

At 710, base station 105-*b* may identify symbols (e.g., one or more slots) on which at least one second UE is to transmit second data.

At 715, base station 105-*b* may determine resources (e.g., time-frequency resources, such as symbols) allocated for an uplink transmission of the first data from UE 115-*e*. Base station 105-*b* may also determine a set of the allocated resources for UE 115-*e* to transmit the uplink transmission according to a first power level, where the set may be based on the identified symbols for the at least one second UE, and where the set of symbols may overlap, at least in part, the symbols on which the at least one second UE is to transmit the second data of the second service type. The first power level may be greater than a second power level configured for uplink transmissions (e.g., may be power-boosted compared to one or more other uplink transmissions).

In some cases, determining the allocated resources may include identifying resources (e.g., symbols) of the allocated resources that are within a first slot of a set of slots for the uplink transmission, where the set of allocated resources may correspond to the identified resources. In some cases, determining the allocated resources may include identifying that the first data is to be transmitted by UE 115-*e* using multiple repetitions of the first data on the allocated resources, where the multiple repetitions may include a first repetition and one or more subsequent repetitions. In some examples, base station 105-*b* may determine the set of the allocated resources corresponding to symbols of the first repetition. In some cases, determining the allocated resources may include identifying that the data is to be transmitted by UE 115-*e* using multiple repetitions of the data on the allocated resources. As such, base station 105-*b* may transmit, to UE 115-*e*, an indication of one or more repetitions of the multiple repetitions for which the UE is to use the first power level (e.g., via a control signal) and may determine the set of the allocated resources corresponding to resources of the one or more repetitions.

In one example, base station 105-*b* may identify that the first data is to be transmitted using multiple repetitions of the first data on the allocated resources, where a first set of the multiple repetitions is to be transmitted according to a first spatial configuration and a second set of the multiple repetitions is to be transmitted according to a second spatial configuration. In some cases, the first spatial configuration and the second spatial configuration may include different TRPs, different antenna arrays, different precoders, different beams, or a combination thereof. In some examples, the set of the allocated resources may be associated with the first spatial configuration and a second set of the allocated resources may be associated with the second spatial configuration. In some cases, base station 105-*b* may determine that the first set of the multiple repetitions to be transmitted according to the first spatial configuration includes a first repetition of the multiple repetitions and may determine to use the first power level for the uplink transmission for the first spatial configuration based on the first repetition being transmitted according to the first spatial configuration.

At 720, base station 105-*b* may transmit, to UE 115-*e*, a control signal identifying the determined resources allocated for the uplink transmission of the first data and indicating the set of the allocated resources on which UE 115-*e* is to transmit the uplink transmission according to the first power level. In some cases, the control signal may include a DCI signal, an RRC signal, or a MAC CE. In some cases, the control signal may include a command for UE 115-*e* to use the first power level for the set of the allocated resources. In some cases, base station 105-*b* may transmit, to UE 115-*e*, an indication of the set of the allocated resources, and in some examples, the control signal may include the indication of the set of the allocated resources. For example, the indication of the set of the allocated resources may include a bitmap having a bit-width corresponding to a maximum length for uplink transmissions of a service type of the uplink transmission. In some cases, the control signal may further include the indication of the one or more repetitions identified by base station 105-*b*. For example, the indication of the one or more repetitions may include a bitmap having a bit-width corresponding to a maximum number of repetitions for a service type of the uplink transmission.

In some cases, base station 105-*b* may transmit an indicator of one of a set of increased transmit power modes for UE 115-*e*. In some cases, a first of the set of increased transmit power modes may indicate that UE 115-*e* is to transmit the uplink transmission according to the first power level for a subset of slots of the uplink transmission. A second of the set of increased transmit power modes may indicate that UE 115-*e* is to transmit the uplink transmission according to the first power level for all the slots of the uplink transmission. A third of the set of increased transmit power modes may indicate that UE 115-*e* is to transmit the uplink transmission according to the first power level for a subset of repetitions of the uplink transmission.

In some cases, the indication that the set of the allocated resources on which UE 115-*e* is to transmit the uplink transmission according to the first power level may include an indication that data repetition is disabled on the allocated resources identified by the control signal. In some cases, the control signal may further include an indication that data repetition is enabled on the allocated resources identified by the control signal, and the set of the allocated resources for which UE 115-*e* is to transmit the uplink transmission according to the first power level may be further determined based on the indication that data repetition is enabled. In some cases, the indication that data repetition is enabled may identify that a number of repetitions is one or that all repetitions of the data are within a same slot. In some cases, the control signal may include an indication that UE 115-*e* is to use the first power level for the uplink transmission for the first spatial configuration (e.g., identified by base station 105-*b*).

At 725, UE 115-*e* may determine, based on the control signal, the set of the allocated resources for which UE 115-*e* is to transmit the uplink transmission according to the first power level. In some cases, determining the set of the allocated resources may include identifying resources (e.g., symbols) of the allocated resources that are within a first slot of a set of slots for the uplink transmission, where the set of allocated resources may correspond to the identified resources. In some cases, determining the set of the allocated resources may include identifying that the data is to be transmitted using multiple repetitions of the data on the allocated resources, where the multiple repetitions may include a first repetition and one or more subsequent repetitions. In some examples, UE 115-*e* may determine the first subset of the allocated resources corresponding to symbols of the first repetition. In some examples, UE 115-*e* may receive, from base station 105-*b*, an indication of one or more repetitions of the multiple repetitions for which UE 115-*e* is to use the first power level and may determine the first subset of the allocated resources corresponding to symbols of the one or more repetitions.

At 730, UE 115-*e* may identify that the data is to be transmitted using multiple repetitions of the data on the allocated resources, where a first set of the multiple repetitions is to be transmitted according to a first spatial configuration and a second set of the multiple repetitions is to be transmitted according to a second spatial configuration. In some examples, the set of the allocated resources may be associated with the first spatial configuration, and the second set of the allocated resources may be associated with the second spatial configuration. In some cases, determining the set of the allocated resources may include determining that the first set of the multiple repetitions to be transmitted according to the first spatial configuration includes a first repetition of the multiple repetitions. As such, UE 115-*e* may determine to increase the transmit power for the uplink transmission for the first spatial configuration based on the first repetition being transmitted according to the first spatial configuration.

At 735, UE 115-*e* may transmit the uplink transmission of data on the set of the allocated resources according to the first power level.

Figure 8:
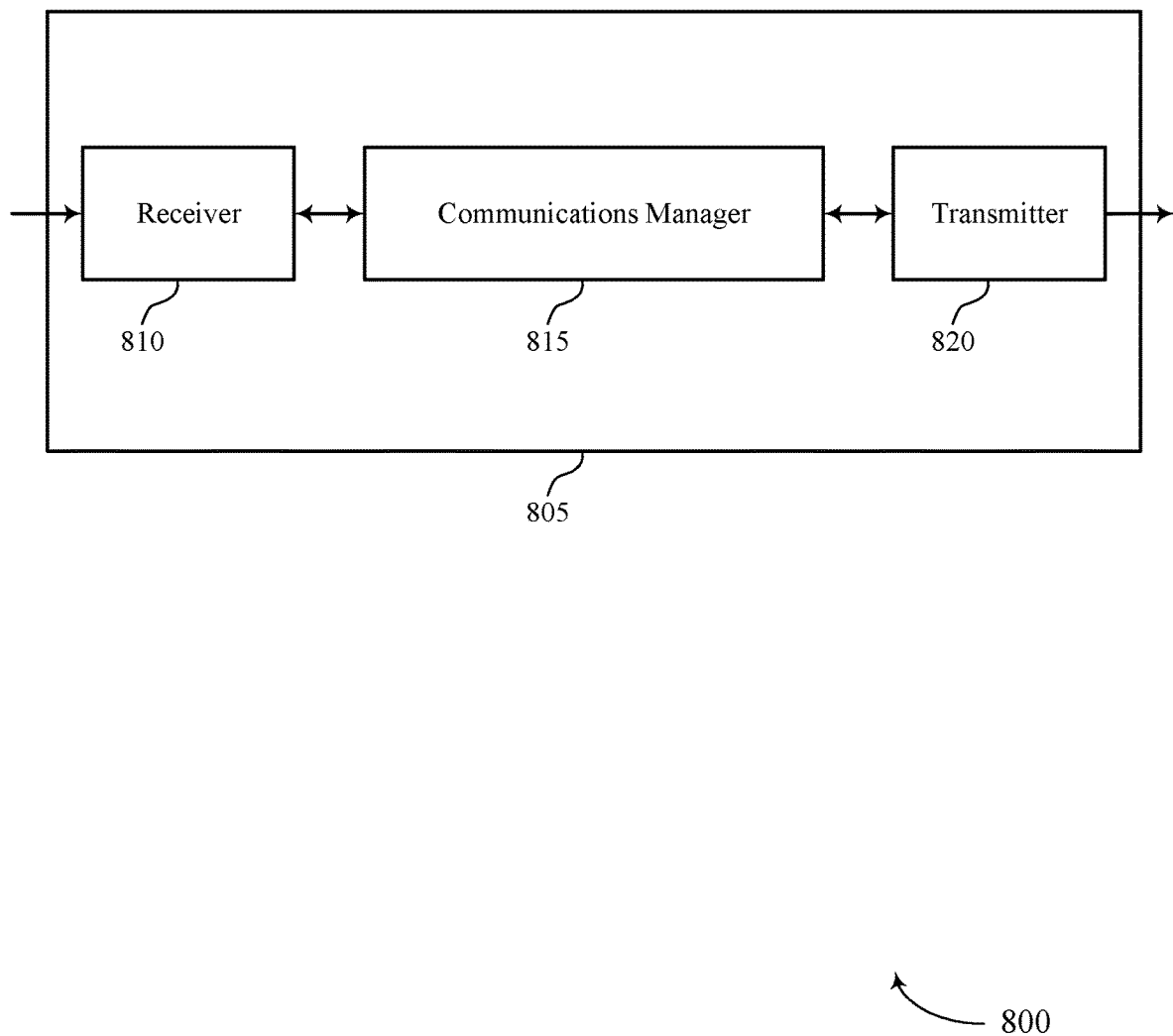
FIGS. 8 and 9 show block diagrams of devices that support power-boosting design for multi-slot shared channels in accordance with aspects of the present disclosure.

FIG. 8 shows a block diagram 800 of a device 805 that supports power-boosting design for multi-slot shared channels in accordance with aspects of the present disclosure. The device 805 may be an example of aspects of a UE 115 as described herein. The device 805 may include a receiver 810, a communications manager 815, and a transmitter 820. The device 805 may also include one or more processors, memory coupled with the one or more processors, and instructions stored in the memory that are executable by the one or more processors to enable the one or more processors to perform the power-boosting features discussed herein. Each of these components may be in communication with one another (e.g., via one or more buses).

The receiver 810 may receive information such as packets, user data, or control information associated with various information channels (e.g., control channels, data channels, and information related to power-boosting design for multi-slot shared channels, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a control signal identifying resources allocated for an uplink transmission of data and a first power level associated with the uplink transmission, the first power level greater than a second power level configured for uplink transmissions, determine, based on the control signal, a set of the allocated resources for which the UE is to transmit the uplink transmission according to the first power level, and transmit the uplink transmission of the data on the set of the allocated resources according to the first power level. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

In some cases, the communications manager 815 may be a processor (e.g., a transceiver processor, or a radio processor, or a receiver processor). The processor may be coupled with memory and may execute instructions stored in the memory that enable the processor to perform or facilitate the power-boosting features discussed herein.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The actions performed by the communications manager 815 as described herein may be implemented to realize one or more potential advantages. For example, communications manager 815 may increase communication reliability and decrease communication latency at a UE 115 by enabling power boosting for high-priority communications, which may reduce transmission delays, improve transmission accuracy, and reduce retransmissions. Similarly, communications manager 815 may save power and increase battery life at a UE 115 by strategically boosting power for transmissions experiencing interference.

Figure 9:
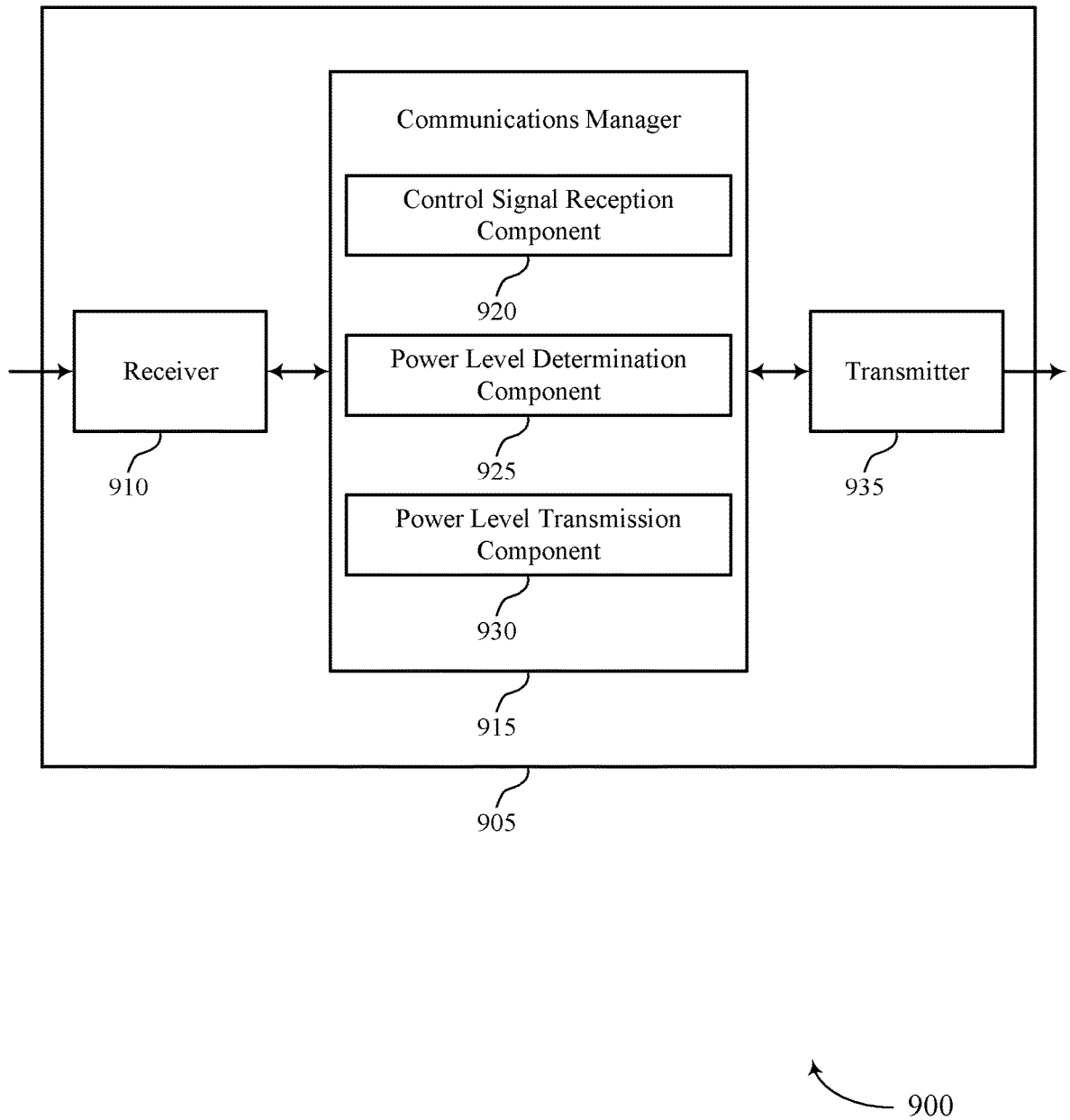

FIG. 9 shows a block diagram 900 of a device 905 that supports power-boosting design for multi-slot shared channels in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to power-boosting design for multi-slot shared channels, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control signal reception component 920, a power level determination component 925, and a power level transmission component 930. The communications manager 915 may be an example of aspects of the communications manager 1110 described herein.

The control signal reception component 920 may receive, from a base station, a control signal identifying resources allocated for an uplink transmission of data and a first power level associated with the uplink transmission, the first power level greater than a second power level configured for uplink transmissions. The power level determination component 925 may determine, based on the control signal, a set of the allocated resources for which the UE is to transmit the uplink transmission according to the first power level. The power level transmission component 930 may transmit the uplink transmission of the data on the set of the allocated resources according to the first power level.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

In some cases, the control signal reception component 920, power level determination component 925, and power level transmission component 930 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal reception component 920, power level determination component 925, and power level transmission component 930 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

A processor of a UE 115 (for example, controlling the receiver 910, the transmitter 935, or the transceiver 1120 as described with reference to FIG. 11) may increase communication reliability and accuracy by enabling the UE 115 to perform uplink power-boosting, increase reliability, and reduce latency (e.g., via implementation of system components described with reference to FIG. 10). Further, the processor of the UE 115 may identify one or more aspects of a power-boosting configuration to perform the processes described herein. The processor of the UE 115 may use the power-boosting configuration to boost power for uplink communications, increase communication accuracy, and increase communication reliability. The processor of the UE 115 may further use the power-boosting configuration to save power and increase battery life at the UE 115 (e.g., by reducing retransmissions and by strategically determining when to apply power-boosting).

Figure 10:
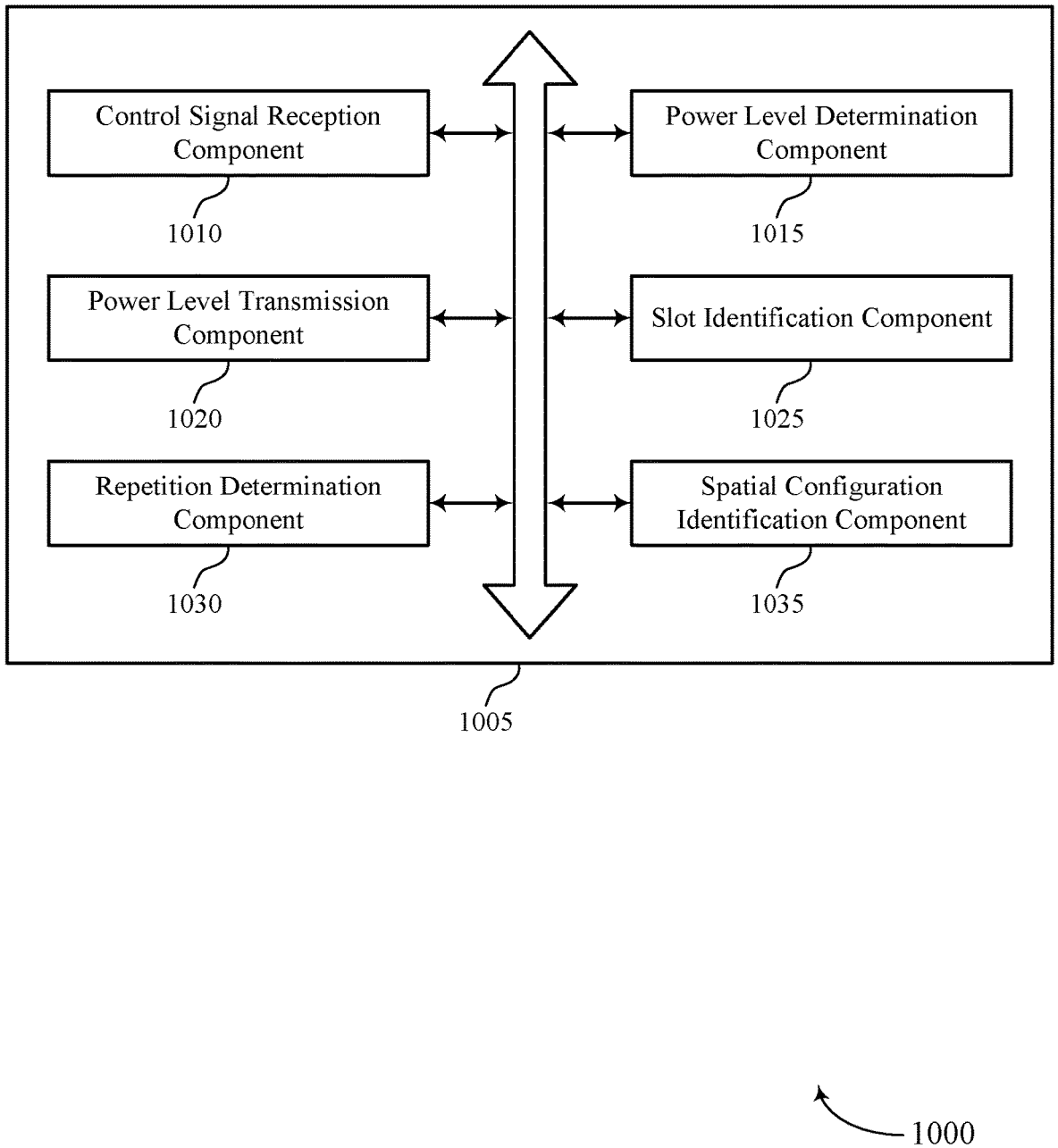
FIG. 10 shows a block diagram of a communications manager that supports power-boosting design for multi-slot shared channels in accordance with aspects of the present disclosure.

FIG. 10 shows a block diagram 1000 of a communications manager 1005 that supports power-boosting design for multi-slot shared channels in accordance with aspects of the present disclosure. The communications manager 1005 may be an example of aspects of a communications manager 815, a communications manager 915, or a communications manager 1110 described herein. The communications manager 1005 may include a control signal reception component 1010, a power level determination component 1015, a power level transmission component 1020, a slot identification component 1025, a repetition determination component 1030, and a spatial configuration identification component 1035. Each of these modules may communicate, directly or indirectly, with one another (e.g., via one or more buses).

In some cases, the communications manager 1005 may be a processor (e.g., a transceiver processor, or a radio processor, or a receiver processor). The processor may be coupled with memory and may execute instructions stored in the memory that enable the processor to perform or facilitate the power-boosting features discussed herein.

The control signal reception component 1010 may receive, from a base station, a control signal identifying resources allocated for an uplink transmission of data and a first power level associated with the uplink transmission, the first power level greater than a second power level configured for uplink transmissions. In some cases, a first service type of the uplink transmission has one or both of a lower latency specification or a higher reliability specification than a second service type used by the UE. In some cases, the control signal includes a DCI signal, or an RRC signal, or a MAC CE.

The power level determination component 1015 may determine, based on the control signal, a set of the allocated resources for which the UE is to transmit the uplink transmission according to the first power level. In some examples, the power level determination component 1015 may receive, from the base station, an indication of the set of the allocated resources. In some examples, the power level determination component 1015 may receive an indicator of one of a set of increased transmit power modes for the UE.

In some cases, the power level determination component 1015 may determine, based on the control signal, a second set of the allocated resources for which the UE is to transmit the uplink transmission according to the second power level and may transmit the uplink transmission of the data on the second set of the allocated resources according to the second power level. In some cases, the set of the allocated resources corresponds to all the resources allocated for the uplink transmission of data.

In some cases, the control signal includes a command for the UE to use the first power level for the set of the allocated resources. In some cases, the control signal includes the indication of the set of the allocated resources. In some cases, the indication of the set of the allocated resources includes a bitmap having a bit-width corresponding to a maximum length for uplink transmissions of a service type of the uplink transmission. In some cases, a first of the set of increased transmit power modes indicates that the UE is to transmit the uplink transmission according to the first power level for a subset of slots of the uplink transmission. In some cases, a second of the set of increased transmit power modes indicates that the UE is to transmit the uplink transmission according to the first power level for all the slots of the uplink transmission. In some cases, a third of the set of increased transmit power modes indicates that the UE is to transmit the uplink transmission according to the first power level for a subset of repetitions of the uplink transmission.

In some cases, the control signal includes an indication that data repetition is disabled on the allocated resources identified by the control signal. In some cases, the control signal includes an indication that data repetition is enabled on the allocated resources identified by the control signal, and the set of the allocated resources for which the UE is to transmit the uplink transmission according to the first power level is further determined based on the indication that data repetition is enabled. In some cases, the indication that data repetition is enabled identifies that a number of repetitions is one. In some cases, the indication that data repetition is enabled identifies that all repetitions are within a same slot.

The power level transmission component 1020 may transmit the uplink transmission of the data on the set of the allocated resources according to the first power level.

The slot identification component 1025 may identify resources of the allocated resources that are within a first slot of a set of slots for the uplink transmission, where the set of allocated resources correspond to the identified resources.

The repetition determination component 1030 may identify that the data is to be transmitted using a set of repetitions on the allocated resources, the set of repetitions including a first repetition and one or more subsequent repetitions. In some examples, the repetition determination component 1030 may determine the set of the allocated resources corresponding to symbols of the first repetition. In some examples, the repetition determination component 1030 may identify that the data is to be transmitted using a set of repetitions on the allocated resources. In some examples, the repetition determination component 1030 may receive, from the base station, an indication of one or more repetitions of the set of repetitions for which the UE is to use the first power level. In some examples, the repetition determination component 1030 may determine the set of the allocated resources corresponding to symbols of the one or more repetitions. In some cases, the control signal further includes the indication of the one or more repetitions. In some cases, the indication of the one or more repetitions includes a bitmap having a bit-width corresponding to a maximum number of repetitions for a service type of the uplink transmission.

The spatial configuration identification component 1035 may identify that the data is to be transmitted using a set of repetitions on the allocated resources, a first set of the set of repetitions to be transmitted according to a first spatial configuration and a second set of the set of repetitions to be transmitted according to a second spatial configuration, where the set of the allocated resources is associated with the first spatial configuration. In some examples, the spatial configuration identification component 1035 may determine that the first set of the set of repetitions to be transmitted according to the first spatial configuration includes a first repetition of the set of repetitions.

In some examples, the spatial configuration identification component 1035 may determine to use the first power level for the uplink transmission for the first spatial configuration based on the first repetition being transmitted according to the first spatial configuration. In some cases, the control signal includes an indication that the UE is to use the first power level for the uplink transmission for the first spatial configuration. In some cases, the first spatial configuration and the second spatial configuration include different TRPs, or different antenna arrays, or different precoders, or different beams, or a combination thereof.

In some cases, the control signal reception component 1010, power level determination component 1015, power level transmission component 1020, slot identification component 1025, repetition determination component 1030, and spatial configuration identification component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal reception component 1010, power level determination component 1015, power level transmission component 1020, slot identification component 1025, repetition determination component 1030, and spatial configuration identification component 1035 discussed herein.

Figure 11:
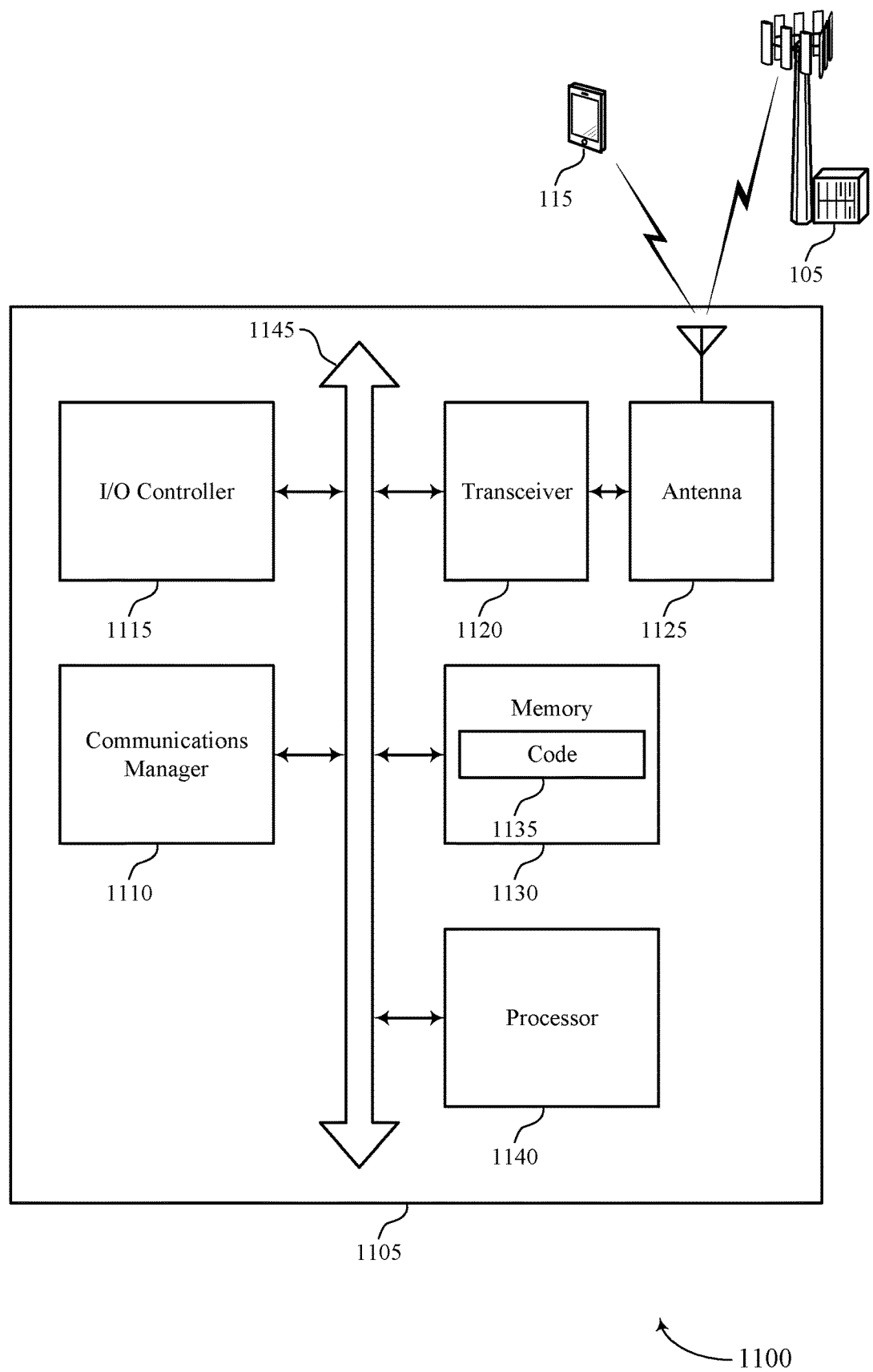
FIG. 11 shows a diagram of a system including a device that supports power-boosting design for multi-slot shared channels in accordance with aspects of the present disclosure.

FIG. 11 shows a diagram of a system 1100 including a device 1105 that supports power-boosting design for multi-slot shared channels in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

In some cases, the communications manager 1110 may be a processor (e.g., a transceiver processor, or a radio processor, or a receiver processor). The processor may be coupled with memory and may execute instructions stored in the memory that enable the processor to perform or facilitate the power-boosting features discussed herein.

The communications manager 1110 may receive, from a base station, a control signal identifying resources allocated for an uplink transmission of data and a first power level associated with the uplink transmission, the first power level greater than a second power level configured for uplink transmissions, determine, based on the control signal, a set of the allocated resources for which the UE is to transmit the uplink transmission according to the first power level, and transmit the uplink transmission of the data on the set of the allocated resources according to the first power level.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power-boosting design for multi-slot shared channels).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
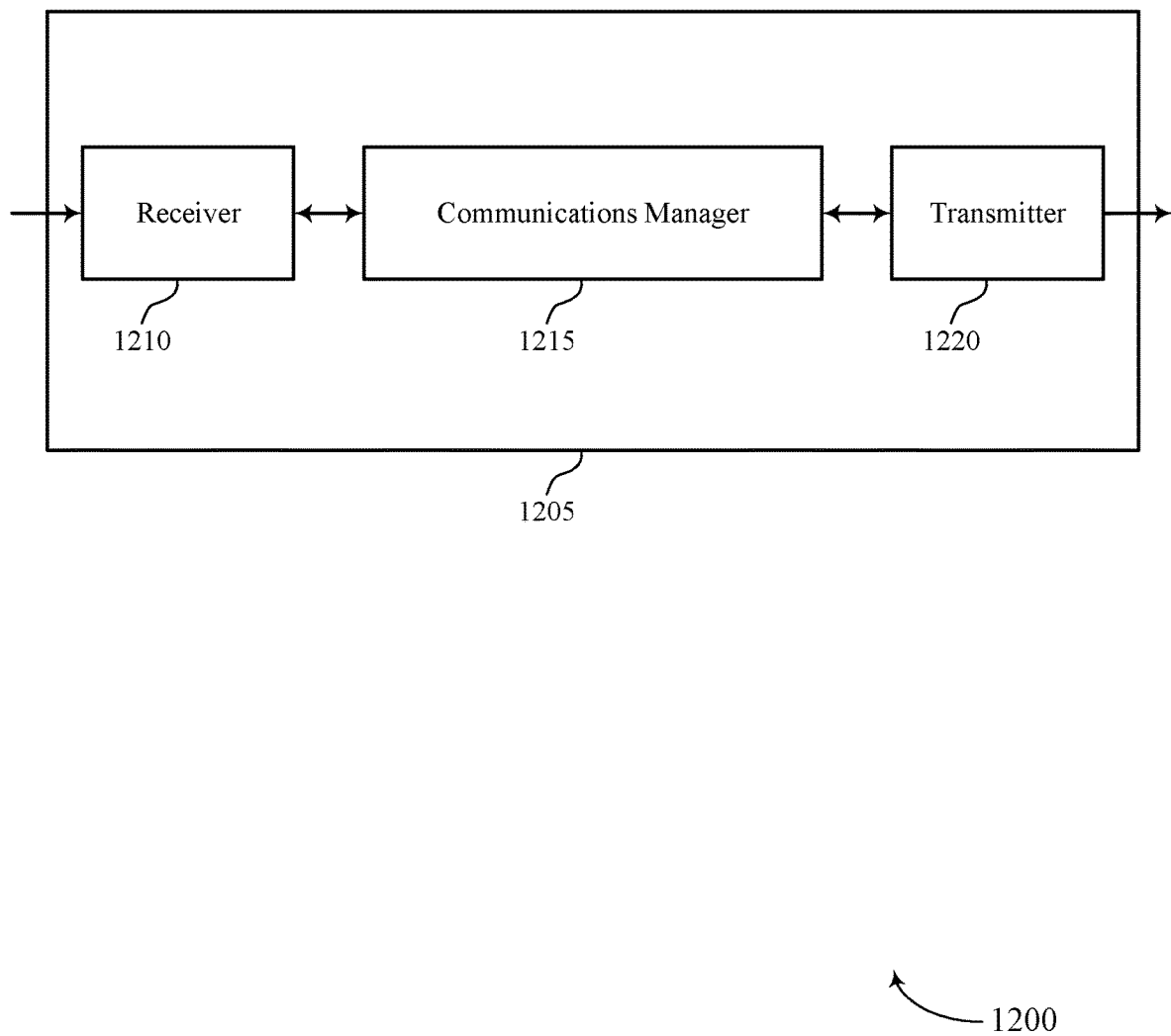
FIGS. 12 and 13 show block diagrams of devices that support power-boosting design for multi-slot shared channels in accordance with aspects of the present disclosure.

FIG. 12 shows a block diagram 1200 of a device 1205 that supports power-boosting design for multi-slot shared channels in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to power-boosting design for multi-slot shared channels, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify first data to be transmitted by a first UE, identify symbols on which at least one second UE is to transmit second data, determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmit, to the first UE, a control signal identifying the allocated resources, the first power level associated with the uplink transmission, and the set of the allocated resources on which the first UE is to transmit the uplink transmission according to the first power level. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

In some cases, the communications manager 1215 may be a processor (e.g., a transceiver processor, or a radio processor, or a receiver processor). The processor may be coupled with memory and may execute instructions stored in the memory that enable the processor to perform or facilitate the power-boosting features discussed herein.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
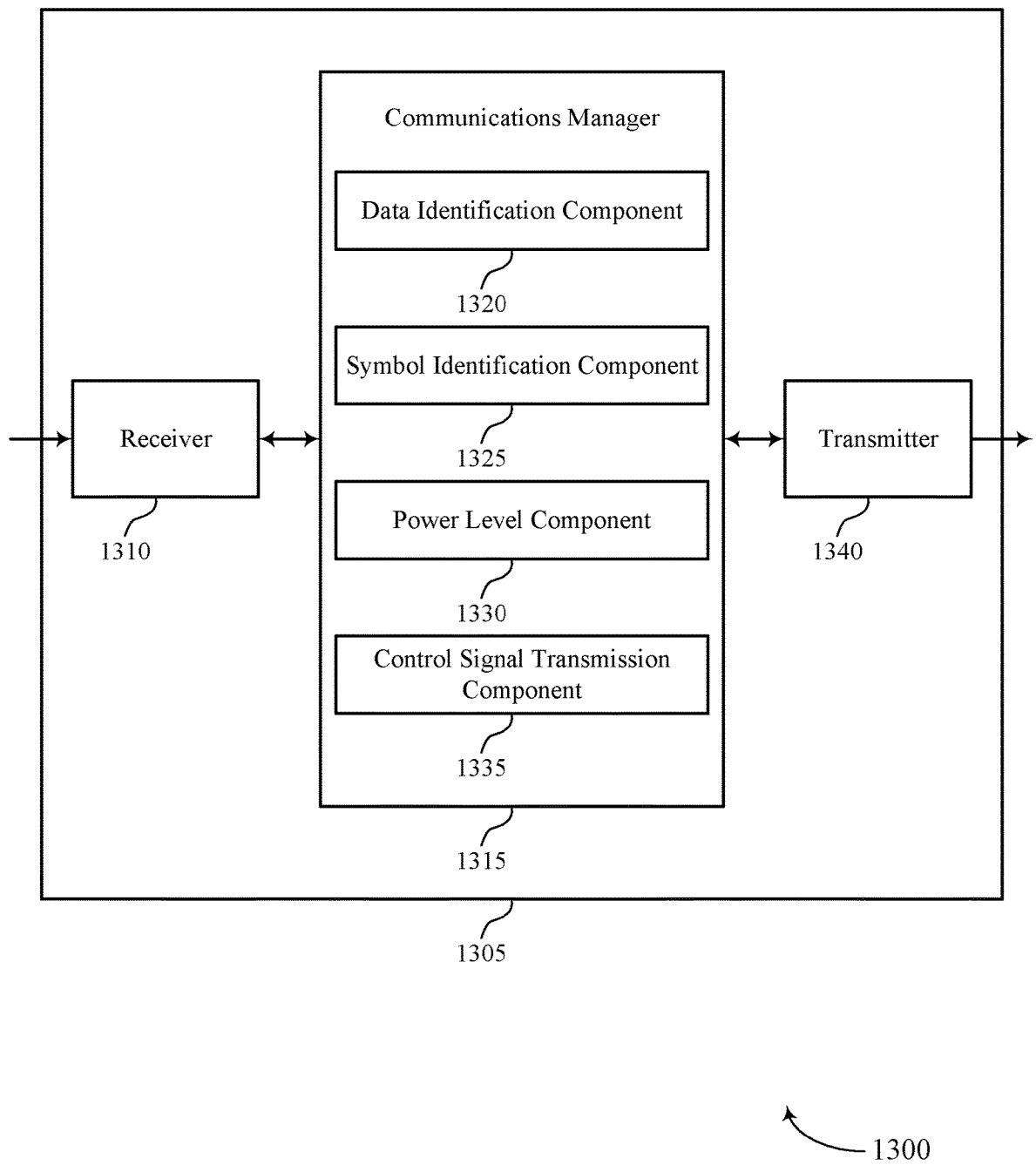

FIG. 13 shows a block diagram 1300 of a device 1305 that supports power-boosting design for multi-slot shared channels in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to power-boosting design for multi-slot shared channels, etc.). Information may be passed on to other components of the device 1305. The receiver 1310 may be an example of aspects of the transceiver 1520 described with reference to FIG. 15. The receiver 1310 may utilize a single antenna or a set of antennas.

In some cases, the communications manager 1315 may be a processor (e.g., a transceiver processor, or a radio processor, or a receiver processor). The processor may be coupled with memory and may execute instructions stored in the memory that enable the processor to perform or facilitate the power-boosting features discussed herein. The communications manager 1315 may be an example of aspects of the communications manager 1215 as described herein. The communications manager 1315 may include a data identification component 1320, a symbol identification component 1325, a power level component 1330, and a control signal transmission component 1335. The communications manager 1315 may be an example of aspects of the communications manager 1510 described herein.

The data identification component 1320 may identify first data to be transmitted by a first UE. The symbol identification component 1325 may identify symbols on which at least one second UE is to transmit second data. The power level component 1330 may determine resources allocated for an uplink transmission of the first data by the first UE, a set of the allocated resources for the first UE to transmit the uplink transmission according to a first power level based on the identified symbols for the at least one second UE, and the set of allocated resources overlapping at least in part the symbols on which the at least one second UE is to transmit the second data. The control signal transmission component 1335 may transmit, to the first UE, a control signal identifying the allocated resources, the first power level associated with the uplink transmission, and the set of the allocated resources on which the first UE is to transmit the uplink transmission according to the first power level.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
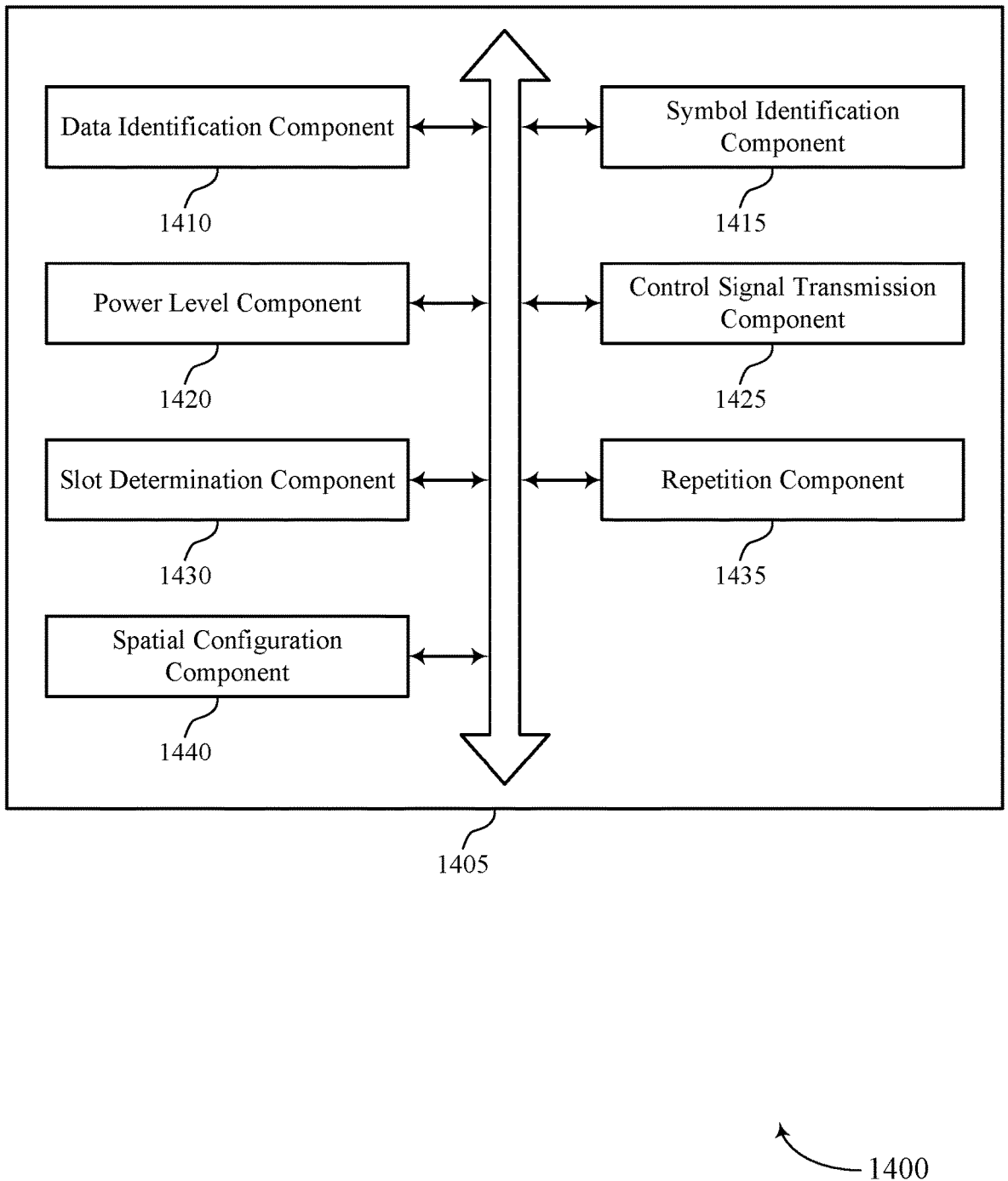
FIG. 14 shows a block diagram of a communications manager that supports power-boosting design for multi-slot shared channels in accordance with aspects of the present disclosure.

FIG. 14 shows a block diagram 1400 of a communications manager 1405 that supports power-boosting design for multi-slot shared channels in accordance with aspects of the present disclosure. The communications manager 1405 may be an example of aspects of a communications manager 1215, a communications manager 1315, or a communications manager 1510 described herein. The communications manager 1405 may include a data identification component 1410, a symbol identification component 1415, a power level component 1420, a control signal transmission component 1425, a slot determination component 1430, a repetition component 1435, and a spatial configuration component 1440. Each of these modules may communicate, directly or indirectly, with one another (e.g., via one or more buses).

In some cases, the communications manager 1405 may be a processor (e.g., a transceiver processor, or a radio processor, or a receiver processor). The processor may be coupled with memory and may execute instructions stored in the memory that enable the processor to perform or facilitate the power-boosting features discussed herein.

The data identification component 1410 may identify first data to be transmitted by a first UE. In some cases, a first service type of the first data has one or both of a lower latency specification or a higher reliability specification than a second service type used by the first UE. The symbol identification component 1415 may identify symbols on which at least one second UE is to transmit second data.

The power level component 1420 may determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data. In some examples, the power level component 1420 may transmit, to the first UE, an indication of the set of the allocated resources.

In some examples, the power level component 1420 may determine a second set of the allocated resources for the first UE to transmit the uplink transmission according to the second power level, and may identify, via the control signal, the second set of the allocated resources on which the first UE is to transmit the uplink transmission according to the second power level.

In some examples, the power level component 1420 may transmit an indicator of one of a set of increased transmit power modes for the first UE. In some cases, the control signal includes a command for the first UE to use the first power level for the set of the allocated resources. In some cases, the control signal includes the indication of the set of the allocated resources. In some cases, the indication of the set of the allocated resources includes a bitmap having a bit-width corresponding to a maximum length for uplink transmissions of a service type of the uplink transmission. In some cases, a first of the set of increased transmit power modes indicates that the first UE is to transmit the uplink transmission according to the first power level for a subset of slots of the uplink transmission. In some cases, a second of the set of increased transmit power modes indicates that the first UE is to transmit the uplink transmission according to the first power level for all the slots of the uplink transmission. In some cases, a third of the set of increased transmit power modes indicates that the first UE is to transmit the uplink transmission according to the first power level for a subset of repetitions of the uplink transmission.

In some cases, the indication of the set of the allocated resources on which the first UE is to transmit the uplink transmission according to the first power level includes an indication that data repetition is disabled on the allocated resources identified by the control signal. In some cases, the control signal further includes an indication that data repetition is enabled on the allocated resources identified by the control signal, and the set of the allocated resources for which the first UE is to transmit the uplink transmission according to the first power level is further determined based on the indication that data repetition is enabled. In some cases, the indication that data repetition is enabled identifies that a number of repetitions is one. In some cases, the indication that data repetition is enabled identifies that all repetitions are within a same slot.

The control signal transmission component 1425 may transmit, to the first UE, a control signal identifying the allocated resources, the first power level associated with the uplink transmission, and the set of the allocated resources on which the first UE is to transmit the uplink transmission according to the first power level. In some cases, the transmitted control signal includes a DCI signal, or an RRC signal, or a MAC CE.

The slot determination component 1430 may identify resources of the allocated resources that are within a first slot of a set of slots for the uplink transmission, where the set of allocated resources correspond to the identified resources.

The repetition component 1435 may identify that the first data is to be transmitted by the first UE using a set of repetitions on the allocated resources, the set of repetitions including a first repetition and one or more subsequent repetitions. In some examples, the repetition component 1435 may determine the set of the allocated resources corresponding to symbols of the first repetition. In some examples, the repetition component 1435 may identify that the first data is to be transmitted by the first UE using a set of repetitions on the allocated resources. In some examples, the repetition component 1435 may transmit, to the first UE, an indication of one or more repetitions of the set of repetitions for which the first UE is to use the first power level. In some examples, the repetition component 1435 may determine the set of the allocated resources corresponding to symbols of the one or more repetitions. In some cases, the control signal further includes the indication of the one or more repetitions. In some cases, the indication of the one or more repetitions includes a bitmap having a bit-width corresponding to a maximum number of repetitions for a service type of the uplink transmission.

The spatial configuration component 1440 may identify that the first data is to be transmitted using a set of repetitions on the allocated resources, a first set of the set of repetitions to be transmitted according to a first spatial configuration and a second set of the set of repetitions to be transmitted according to a second spatial configuration, where the set of the allocated resources is associated with the first spatial configuration. In some examples, the spatial configuration component 1440 may determine that the first set of the set of repetitions to be transmitted according to the first spatial configuration includes a first repetition of the set of repetitions.

In some examples, the spatial configuration component 1440 may determine to use the first power level for the uplink transmission for the first spatial configuration based on the first repetition being transmitted according to the first spatial configuration. In some cases, the control signal includes an indication that the first UE is to use the first power level for the uplink transmission for the first spatial configuration. In some cases, the first spatial configuration and the second spatial configuration include different TRPs, or different antenna arrays, or different precoders, or different beams, or a combination thereof.

Figure 15:
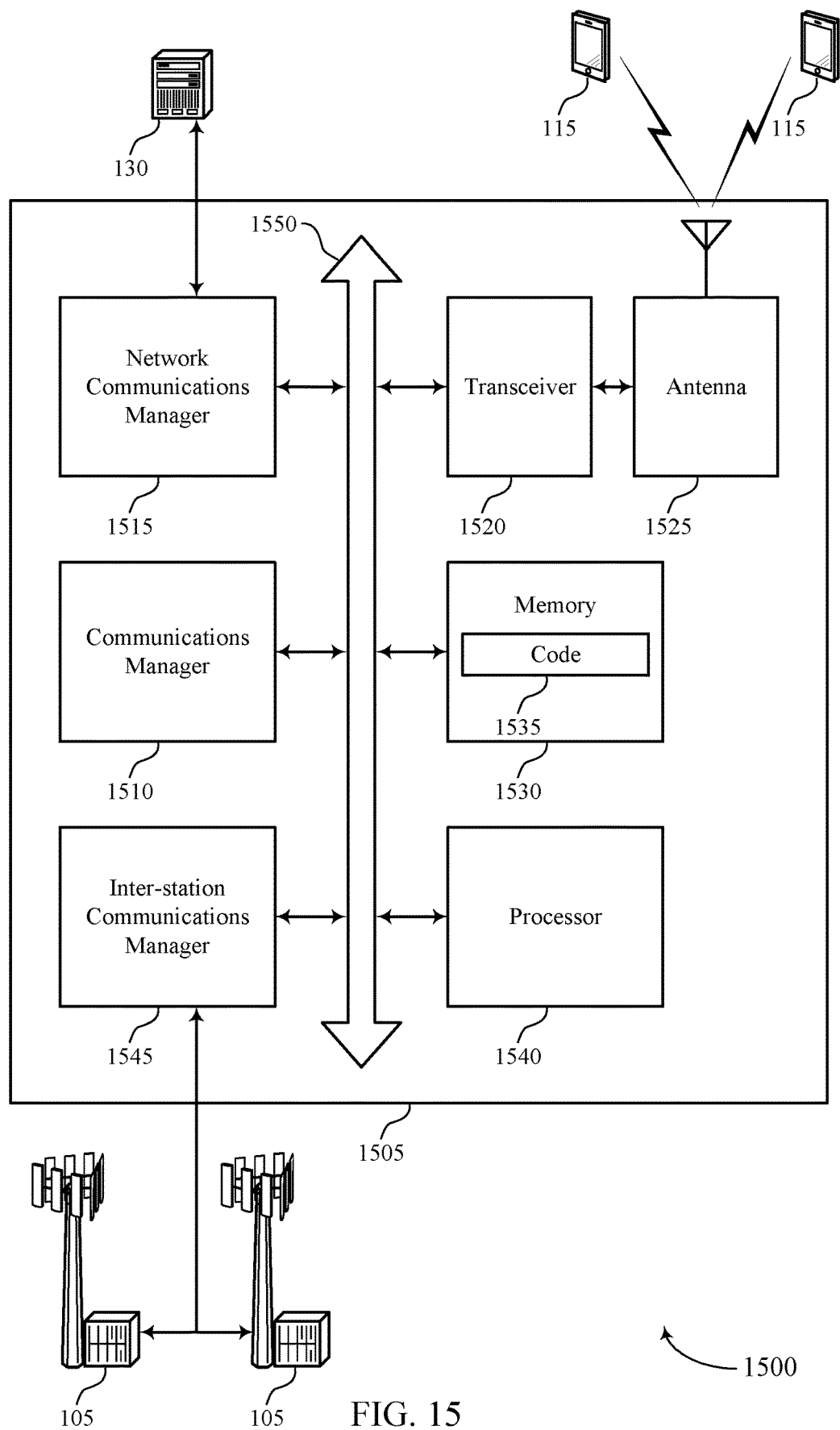
FIG. 15 shows a diagram of a system including a device that supports power-boosting design for multi-slot shared channels in accordance with aspects of the present disclosure.

FIG. 15 shows a diagram of a system 1500 including a device 1505 that supports power-boosting design for multi-slot shared channels in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

In some cases, the communications manager 1510 may be a processor (e.g., a transceiver processor, or a radio processor, or a receiver processor). The processor may be coupled with memory and may execute instructions stored in the memory that enable the processor to perform or facilitate the power-boosting features discussed herein.

The communications manager 1510 may identify first data to be transmitted by a first UE, identify symbols on which at least one second UE is to transmit second data, determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data, and transmit, to the first UE, a control signal identifying the allocated resources, the first power level associated with the uplink transmission, and the set of the allocated resources on which the first UE is to transmit the uplink transmission according to the first power level.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting power-boosting design for multi-slot shared channels).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
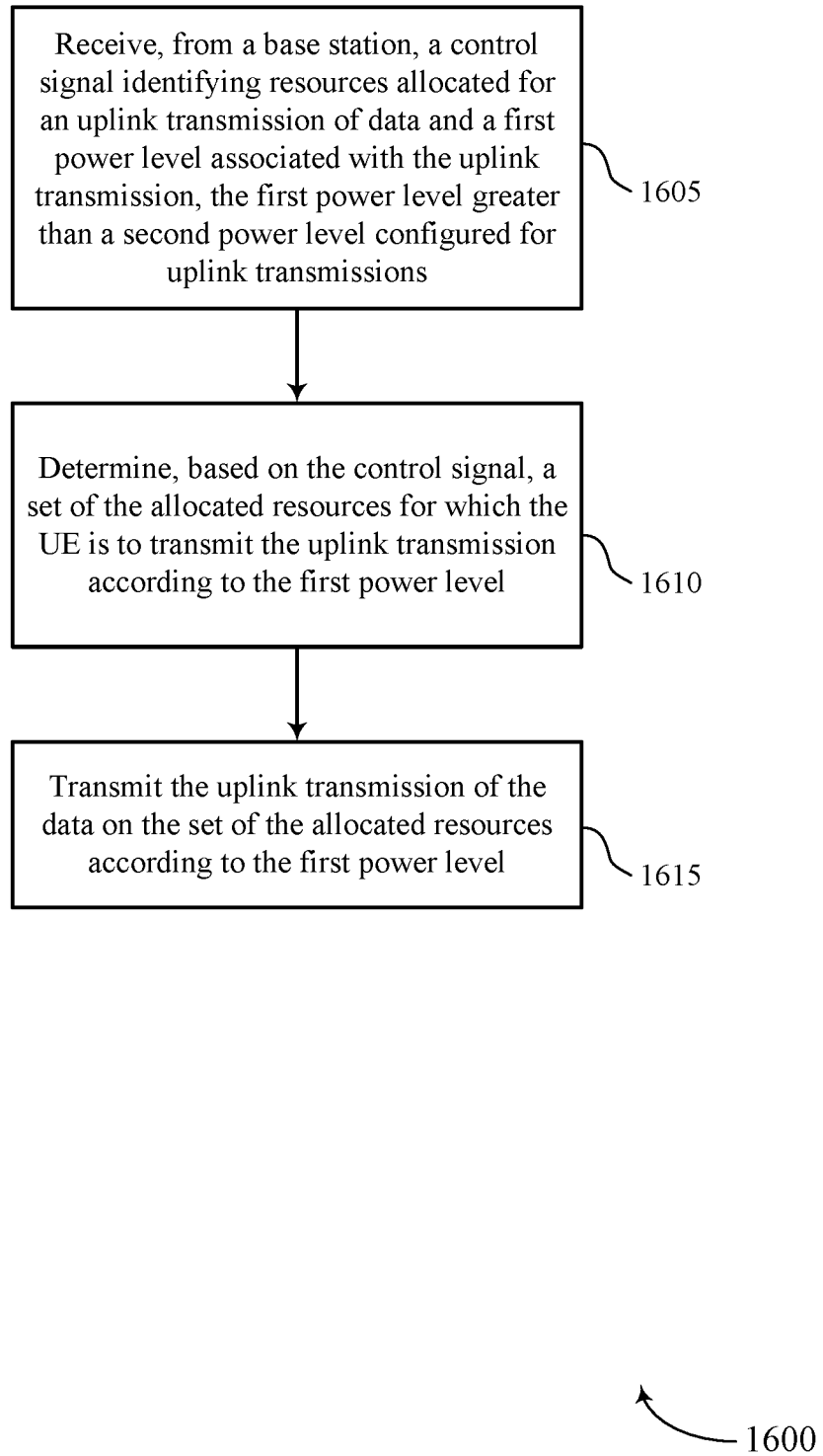
FIGS. 16 through 21 show flowcharts illustrating methods that support power-boosting design for multi-slot shared channels in accordance with aspects of the present disclosure.

FIG. 16 shows a flowchart illustrating a method 1600 that supports power-boosting design for multi-slot shared channels in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a control signal identifying resources allocated for an uplink transmission of data and a first power level associated with the uplink transmission, the first power level greater than a second power level configured for uplink transmissions. The operations of 1605 may be performed according to the methods described herein. In some examples, aspects of the operations of 1605 may be performed by a control signal reception component as described with reference to FIGS. 8 through 11.

At 1610, the UE may determine, based on the control signal, a set of the allocated resources for which the UE is to transmit the uplink transmission according to the first power level. The operations of 1610 may be performed according to the methods described herein. In some examples, aspects of the operations of 1610 may be performed by a power level determination component as described with reference to FIGS. 8 through 11.

At 1615, the UE may transmit the uplink transmission of the data on the set of the allocated resources according to the first power level. The operations of 1615 may be performed according to the methods described herein. In some examples, aspects of the operations of 1615 may be performed by a power level transmission component as described with reference to FIGS. 8 through 11.

Figure 17:
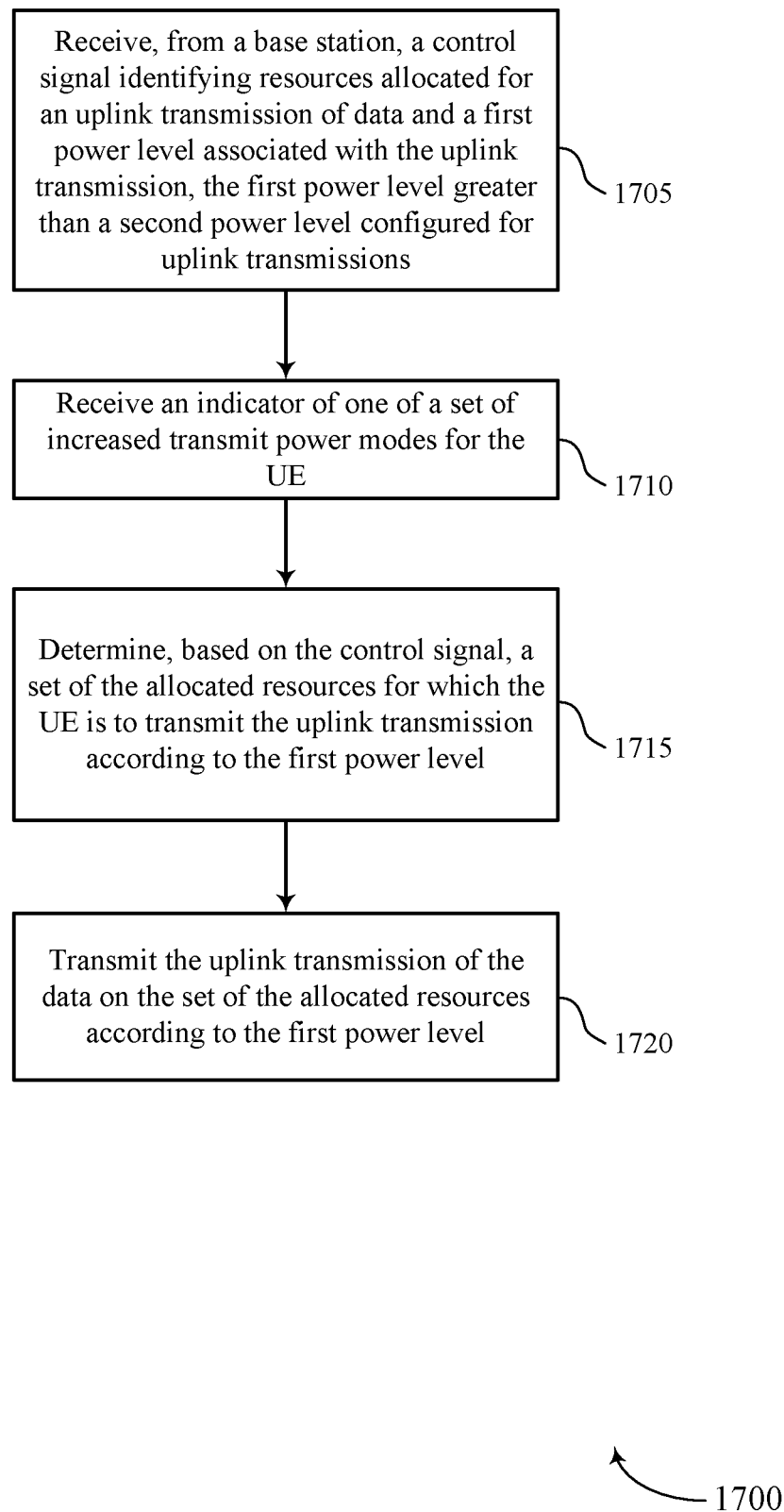

FIG. 17 shows a flowchart illustrating a method 1700 that supports power-boosting design for multi-slot shared channels in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a control signal identifying resources allocated for an uplink transmission of data and a first power level associated with the uplink transmission, the first power level greater than a second power level configured for uplink transmissions. The operations of 1705 may be performed according to the methods described herein. In some examples, aspects of the operations of 1705 may be performed by a control signal reception component as described with reference to FIGS. 8 through 11.

At 1710, the UE may receive an indicator of one of a set of increased transmit power modes for the UE. The operations of 1710 may be performed according to the methods described herein. In some examples, aspects of the operations of 1710 may be performed by a power level determination component as described with reference to FIGS. 8 through 11.

At 1715, the UE may determine, based on the control signal, a set of the allocated resources for which the UE is to transmit the uplink transmission according to the first power level. The operations of 1715 may be performed according to the methods described herein. In some examples, aspects of the operations of 1715 may be performed by a power level determination component as described with reference to FIGS. 8 through 11.

At 1720, the UE may transmit the uplink transmission of the data on the set of the allocated resources according to the first power level. The operations of 1720 may be performed according to the methods described herein. In some examples, aspects of the operations of 1720 may be performed by a power level transmission component as described with reference to FIGS. 8 through 11.

Figure 18:
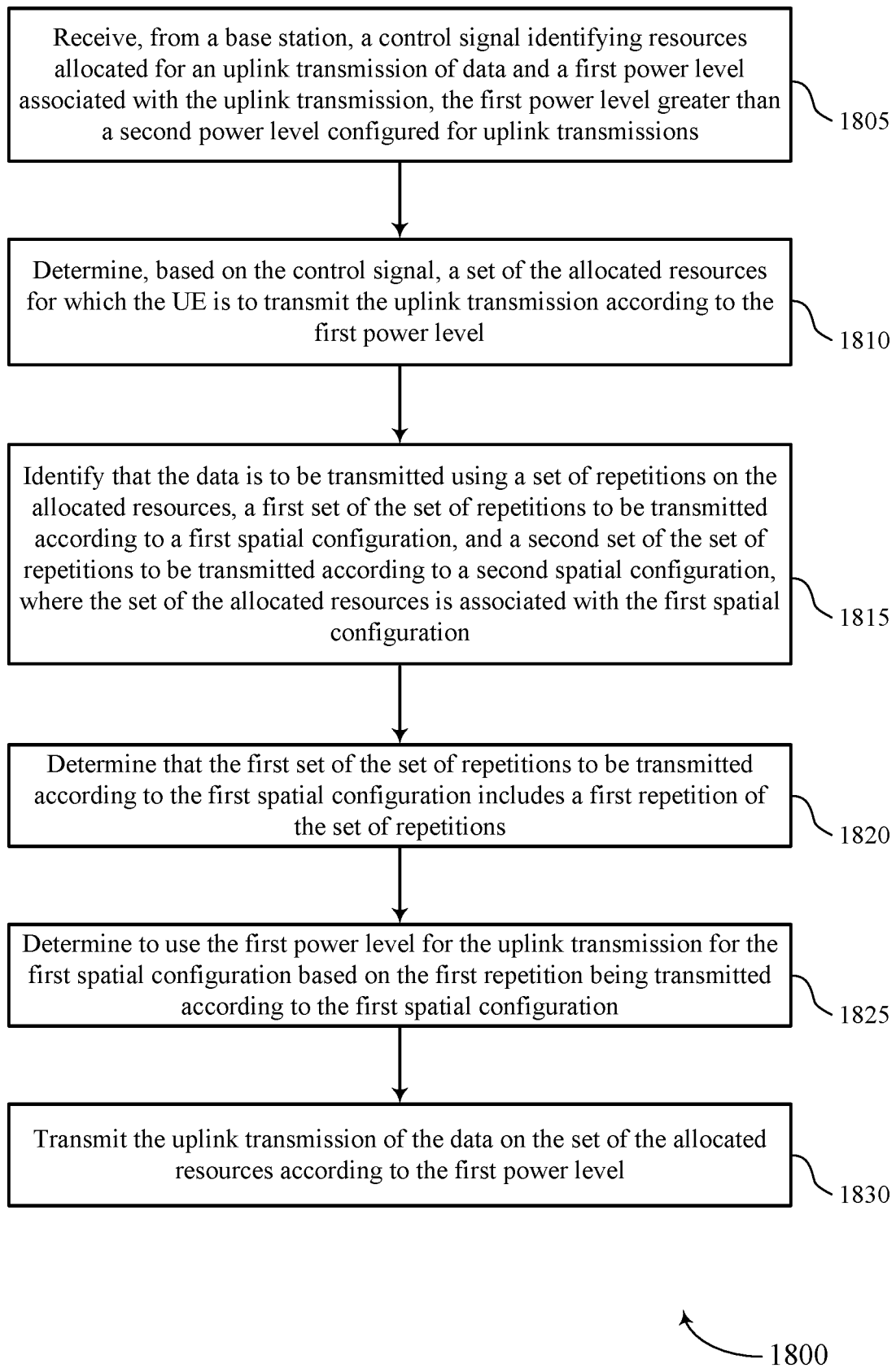

FIG. 18 shows a flowchart illustrating a method 1800 that supports power-boosting design for multi-slot shared channels in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a control signal identifying resources allocated for an uplink transmission of data and a first power level associated with the uplink transmission, the first power level greater than a second power level configured for uplink transmissions. The operations of 1805 may be performed according to the methods described herein. In some examples, aspects of the operations of 1805 may be performed by a control signal reception component as described with reference to FIGS. 8 through 11.

At 1810, the UE may determine, based on the control signal, a set of the allocated resources for which the UE is to transmit the uplink transmission according to the first power level. The operations of 1810 may be performed according to the methods described herein. In some examples, aspects of the operations of 1810 may be performed by a power level determination component as described with reference to FIGS. 8 through 11.

At 1815, the UE may identify that the data is to be transmitted using a set of repetitions on the allocated resources, a first set of the set of repetitions to be transmitted according to a first spatial configuration, and a second set of the set of repetitions to be transmitted according to a second spatial configuration, where the set of the allocated resources is associated with the first spatial configuration. The operations of 1815 may be performed according to the methods described herein. In some examples, aspects of the operations of 1815 may be performed by a spatial configuration identification component as described with reference to FIGS. 8 through 11.

At 1820, the UE may determine that the first set of the set of repetitions to be transmitted according to the first spatial configuration includes a first repetition of the set of repetitions. The operations of 1820 may be performed according to the methods described herein. In some examples, aspects of the operations of 1820 may be performed by a spatial configuration identification component as described with reference to FIGS. 8 through 11.

At 1825, the UE may determine to use the first power level for the uplink transmission for the first spatial configuration based on the first repetition being transmitted according to the first spatial configuration. The operations of 1825 may be performed according to the methods described herein. In some examples, aspects of the operations of 1825 may be performed by a spatial configuration identification component as described with reference to FIGS. 8 through 11.

At 1830, the UE may transmit the uplink transmission of the data on the set of the allocated resources according to the first power level. The operations of 1830 may be performed according to the methods described herein. In some examples, aspects of the operations of 1830 may be performed by a power level transmission component as described with reference to FIGS. 8 through 11.

Figure 19:
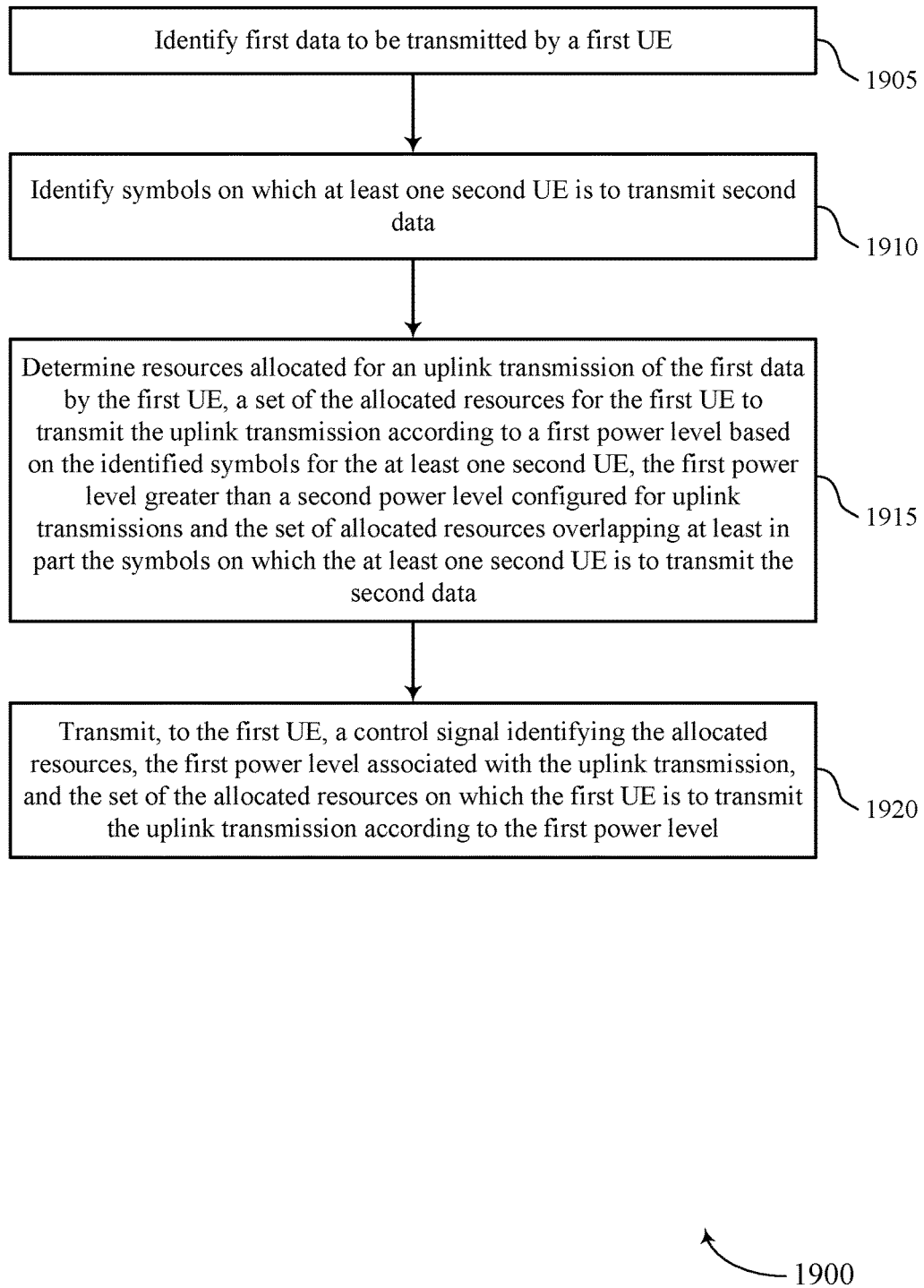

FIG. 19 shows a flowchart illustrating a method 1900 that supports power-boosting design for multi-slot shared channels in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify first data to be transmitted by a first UE. The operations of 1905 may be performed according to the methods described herein. In some examples, aspects of the operations of 1905 may be performed by a data identification component as described with reference to FIGS. 12 through 15.

At 1910, the base station may identify symbols on which at least one second UE is to transmit second data. The operations of 1910 may be performed according to the methods described herein. In some examples, aspects of the operations of 1910 may be performed by a symbol identification component as described with reference to FIGS. 12 through 15.

At 1915, the base station may determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data. The operations of 1915 may be performed according to the methods described herein. In some examples, aspects of the operations of 1915 may be performed by a power level component as described with reference to FIGS. 12 through 15.

At 1920, the base station may transmit, to the first UE, a control signal identifying the allocated resources, the first power level associated with the uplink transmission, and the set of the allocated resources on which the first UE is to transmit the uplink transmission according to the first power level. The operations of 1920 may be performed according to the methods described herein. In some examples, aspects of the operations of 1920 may be performed by a control signal transmission component as described with reference to FIGS. 12 through 15.

Figure 20:
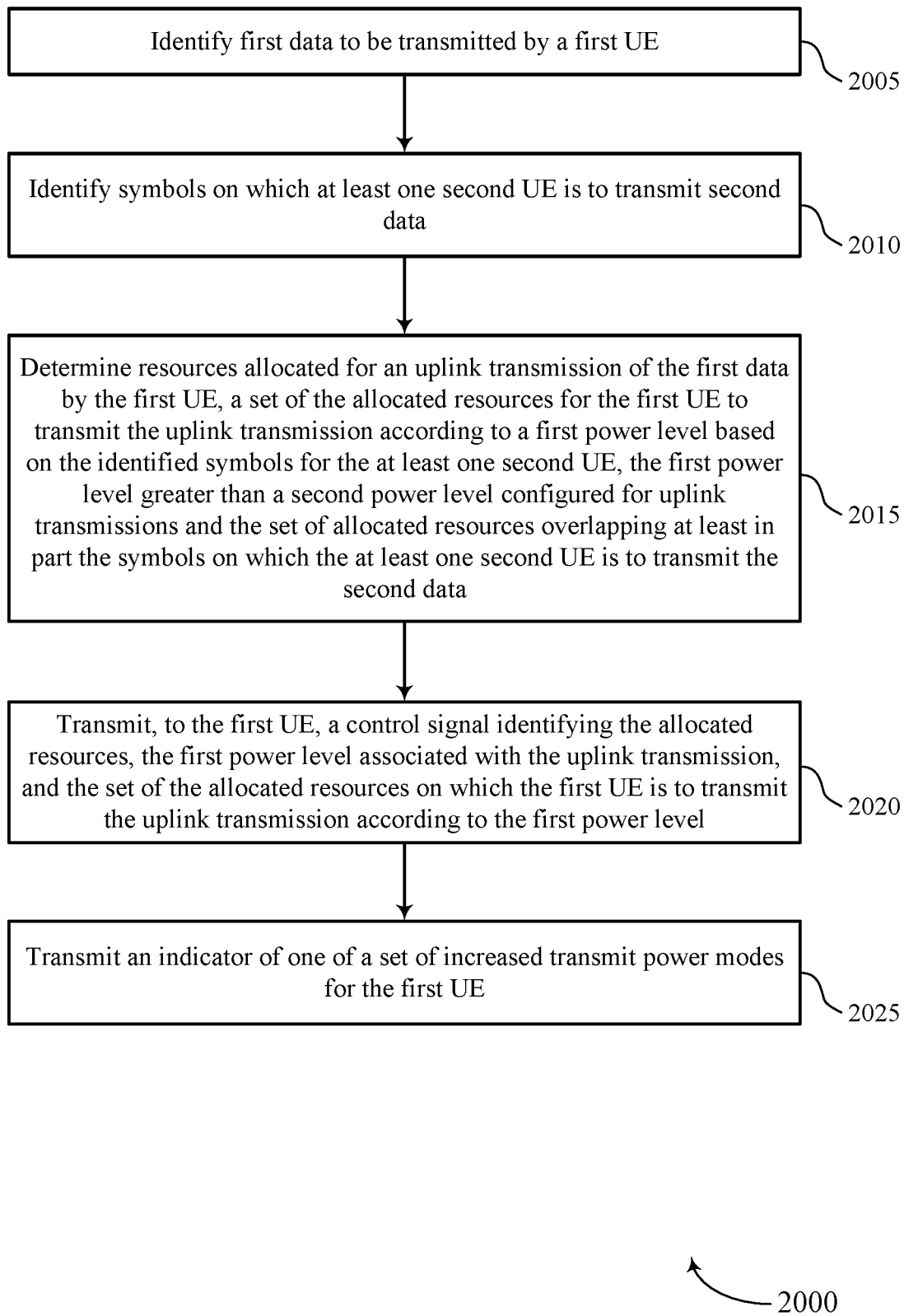

FIG. 20 shows a flowchart illustrating a method 2000 that supports power-boosting design for multi-slot shared channels in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify first data to be transmitted by a first UE. The operations of 2005 may be performed according to the methods described herein. In some examples, aspects of the operations of 2005 may be performed by a data identification component as described with reference to FIGS. 12 through 15.

At 2010, the base station may identify symbols on which at least one second UE is to transmit second data. The operations of 2010 may be performed according to the methods described herein. In some examples, aspects of the operations of 2010 may be performed by a symbol identification component as described with reference to FIGS. 12 through 15.

At 2015, the base station may determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data. The operations of 2015 may be performed according to the methods described herein. In some examples, aspects of the operations of 2015 may be performed by a power level component as described with reference to FIGS. 12 through 15.

At 2020, the base station may transmit, to the first UE, a control signal identifying the allocated resources, the first power level associated with the uplink transmission, and the set of the allocated resources on which the first UE is to transmit the uplink transmission according to the first power level. The operations of 2020 may be performed according to the methods described herein. In some examples, aspects of the operations of 2020 may be performed by a control signal transmission component as described with reference to FIGS. 12 through 15.

At 2025, the base station may transmit an indicator of one of a set of increased transmit power modes for the first UE. The operations of 2025 may be performed according to the methods described herein. In some examples, aspects of the operations of 2025 may be performed by a power level component as described with reference to FIGS. 12 through 15.

Figure 21:
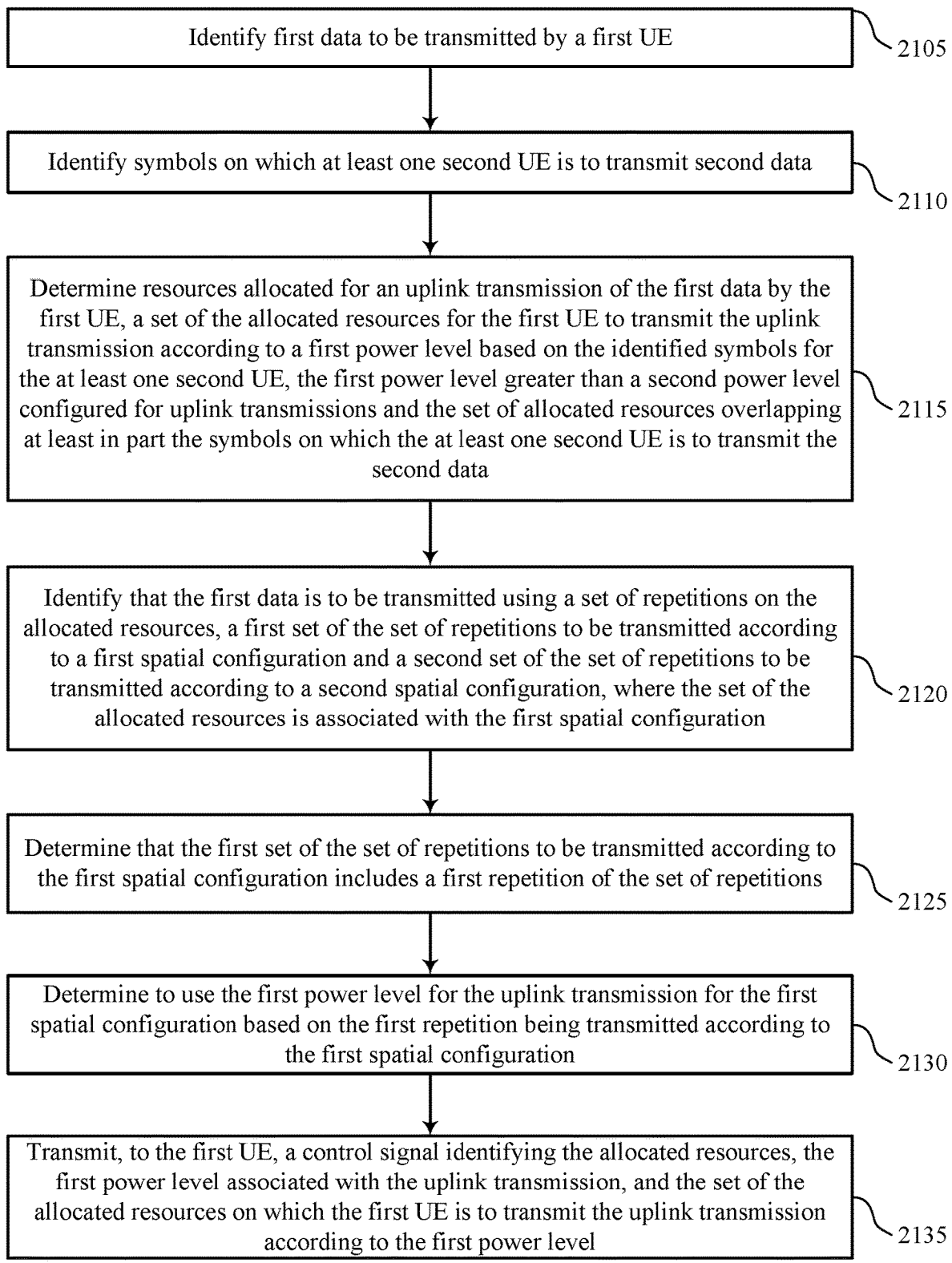

FIG. 21 shows a flowchart illustrating a method 2100 that supports power-boosting design for multi-slot shared channels in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may identify first data to be transmitted by a first UE. The operations of 2105 may be performed according to the methods described herein. In some examples, aspects of the operations of 2105 may be performed by a data identification component as described with reference to FIGS. 12 through 15.

At 2110, the base station may identify symbols on which at least one second UE is to transmit second data. The operations of 2110 may be performed according to the methods described herein. In some examples, aspects of the operations of 2110 may be performed by a symbol identification component as described with reference to FIGS. 12 through 15.

At 2115, the base station may determine resources allocated for an uplink transmission of the first data by the first UE, a set of the allocated resources for the first UE to transmit the uplink transmission according to a first power level based on the identified symbols for the at least one second UE, the first power level greater than a second power level configured for uplink transmissions and the set of allocated resources overlapping at least in part the symbols on which the at least one second UE is to transmit the second data. The operations of 2115 may be performed according to the methods described herein. In some examples, aspects of the operations of 2115 may be performed by a power level component as described with reference to FIGS. 12 through 15.

At 2120, the base station may identify that the first data is to be transmitted using a set of repetitions on the allocated resources, a first set of the set of repetitions to be transmitted according to a first spatial configuration and a second set of the set of repetitions to be transmitted according to a second spatial configuration, where the set of the allocated resources is associated with the first spatial configuration. The operations of 2120 may be performed according to the methods described herein. In some examples, aspects of the operations of 2120 may be performed by a spatial configuration component as described with reference to FIGS. 12 through 15.

At 2125, the base station may determine that the first set of the set of repetitions to be transmitted according to the first spatial configuration includes a first repetition of the set of repetitions. The operations of 2125 may be performed according to the methods described herein. In some examples, aspects of the operations of 2125 may be performed by a spatial configuration component as described with reference to FIGS. 12 through 15.

At 2130, the base station may determine to use the first power level for the uplink transmission for the first spatial configuration based on the first repetition being transmitted according to the first spatial configuration. The operations of 2130 may be performed according to the methods described herein. In some examples, aspects of the operations of 2130 may be performed by a spatial configuration component as described with reference to FIGS. 12 through 15.

At 2135, the base station may transmit, to the first UE, a control signal identifying the allocated resources, the first power level associated with the uplink transmission, and the set of the allocated resources on which the first UE is to transmit the uplink transmission according to the first power level. The operations of 2135 may be performed according to the methods described herein. In some examples, aspects of the operations of 2135 may be performed by a control signal transmission component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory, read-only memory, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control signal identifying resources allocated for an uplink transmission of data and a first power level associated with the uplink transmission, the first power level greater than a second power level configured for uplink transmissions, wherein the control signal indicates a plurality of repetitions for which the UE is to transmit the uplink transmission;
   determining, based at least in part on the control signal, a set of the allocated resources corresponding to the plurality of repetitions for which the UE is to transmit the uplink transmission according to the first power level; and
   transmitting the uplink transmission of the data using the plurality of repetitions on the set of the allocated resources according to the first power level.

2. The method of claim 1, further comprising:
   determining, based at least in part on the control signal, a second set of the allocated resources for which the UE is to transmit the uplink transmission according to the second power level; and
   transmitting the uplink transmission of the data on the second set of the allocated resources according to the second power level.

3. The method of claim 1, wherein the control signal comprises a command for the UE to use the first power level for the set of the allocated resources.

4. The method of claim 1, wherein determining the set of the allocated resources comprises:
   identifying resources of the allocated resources that are within a first slot of a plurality of slots for the uplink transmission, wherein the set of the allocated resources correspond to the identified resources.

5. The method of claim 1, further comprising:
   receiving an indication of the set of the allocated resources.

6. The method of claim 1, wherein determining the set of the allocated resources comprises:

identifying that the data is to be transmitted using the plurality of repetitions on the allocated resources, the plurality of repetitions comprising a first repetition and one or more subsequent repetitions; and
determining the set of the allocated resources corresponding to symbols of the first repetition.

7. The method of claim 1, further comprising:
receiving an indicator of one of a plurality of increased transmit power modes for the UE.

8. The method of claim 7, wherein:
a first transmit power mode of the plurality of increased transmit power modes indicates that the UE is to transmit the uplink transmission according to the first power level for all slots of a plurality of slots for the uplink transmission; and
a second transmit power mode of the plurality of increased transmit power modes indicates that the UE is to transmit the uplink transmission according to the first power level for the plurality of repetitions of the uplink transmission.

9. The method of claim 1, wherein the control signal comprises an indication that data repetition is enabled on the allocated resources identified by the control signal, the set of the allocated resources for which the UE is to transmit the uplink transmission according to the first power level is further determined based at least in part on the indication that data repetition is enabled.

10. The method of claim 1, further comprising:
identifying that the data is to be transmitted using the plurality of repetitions on the allocated resources, a first set of the plurality of repetitions to be transmitted according to a first spatial configuration and a second set of the plurality of repetitions to be transmitted according to a second spatial configuration, wherein the set of the allocated resources is associated with the first spatial configuration.

11. The method of claim 10, wherein the control signal comprises an indication that the UE is to use the first power level for the uplink transmission for the first spatial configuration.

12. The method of claim 10, wherein determining the set of the allocated resources comprises:
determining that the first set of the plurality of repetitions to be transmitted according to the first spatial configuration includes a first repetition of the plurality of repetitions; and
determining to use the first power level for the uplink transmission for the first spatial configuration based at least in part on the first repetition being transmitted according to the first spatial configuration.

13. The method of claim 1, wherein the set of the allocated resources corresponds to all the resources allocated for the uplink transmission of data.

14. A method for wireless communication at a network device, comprising:
identifying first data to be transmitted by a first user equipment (UE);
identifying symbols on which at least one second UE is to transmit second data;
determining, based at least in part on the identified symbols for the at least one second UE, resources allocated for an uplink transmission of the first data by the first UE, a set of the allocated resources corresponding to a plurality of repetitions for which the first UE is to transmit the uplink transmission according to a first power level, the first power level greater than a second power level configured for uplink transmissions and the set of allocated resources overlapping at least in part the symbols on which the at least one second UE is to transmit the second data; and
transmitting, to the first UE, a control signal identifying the allocated resources, the first power level associated with the uplink transmission, and the set of the allocated resources on which the first UE is to transmit the uplink transmission according to the first power level, wherein the control signal indicates the plurality of repetitions for which the UE is to transmit the uplink transmission.

15. The method of claim 14, further comprising:
determining a second set of the allocated resources for the first UE to transmit the uplink transmission according to the second power level; and
identifying, via the control signal, the second set of the allocated resources on which the first UE is to transmit the uplink transmission according to the second power level.

16. The method of claim 14, wherein the control signal comprises a command for the first UE to use the first power level for the set of the allocated resources.

17. The method of claim 14, wherein determining the allocated resources comprises:
identifying symbols of the allocated resources that are within a first slot of a plurality of slots for the uplink transmission, wherein the set of allocated resources correspond to the symbols within the first slot.

18. The method of claim 14, further comprising:
transmitting, to the first UE, an indication of the set of the allocated resources.

19. The method of claim 14, wherein determining the allocated resources comprises:
identifying that the first data is to be transmitted by the first UE using the plurality of repetitions on the allocated resources, the plurality of repetitions comprising a first repetition and one or more subsequent repetitions; and
determining the set of the allocated resources corresponding to symbols of the first repetition.

20. The method of claim 14, further comprising:
transmitting an indicator of one of a plurality of increased transmit power modes for the first UE.

21. The method of claim 20, wherein:
a first transmit power mode of the plurality of increased transmit power modes indicates that the first UE is to transmit the uplink transmission according to the first power level for all slots of a plurality of slots for the uplink transmission; and
a second transmit power mode of the plurality of increased transmit power modes indicates that the first UE is to transmit the uplink transmission according to the first power level for the plurality of repetitions of the uplink transmission.

22. The method of claim 14, wherein the control signal further comprises an indication that data repetition is enabled on the allocated resources identified by the control signal, the set of the allocated resources for which the first UE is to transmit the uplink transmission according to the first power level is further determined based at least in part on the indication that data repetition is enabled.

23. The method of claim 14, further comprising:
identifying that the first data is to be transmitted using the plurality of repetitions on the allocated resources, a first set of the plurality of repetitions to be transmitted according to a first spatial configuration and a second set of the plurality of repetitions to be transmitted according to a second spatial configuration, wherein the set of the allocated resources is associated with the first spatial configuration.

24. The method of claim 23, wherein the control signal comprises an indication that the first UE is to use the first power level for the uplink transmission for the first spatial configuration.

25. The method of claim 23, wherein determining the allocated resources comprises:
   determining that the first set of the plurality of repetitions to be transmitted according to the first spatial configuration includes a first repetition of the plurality of repetitions; and
   determining to use the first power level for the uplink transmission for the first spatial configuration based at least in part on the first repetition being transmitted according to the first spatial configuration.

26. An apparatus for wireless communication at a user equipment (UE), comprising:
   a processor;
   memory coupled with the processor; and
   instructions stored in the memory and executable by the processor to cause the apparatus to:
      receive a control signal identifying resources allocated for an uplink transmission of data and a first power level associated with the uplink transmission, the first power level greater than a second power level configured for uplink transmissions, wherein the control signal indicates a plurality of repetitions for which the UE is to transmit the uplink transmission;
      determine, based at least in part on the control signal, a set of the allocated resources corresponding to the plurality of repetitions for which the UE is to transmit the uplink transmission according to the first power level; and
      transmit the uplink transmission of the data using the plurality of repetitions on the set of the allocated resources according to the first power level.

27. An apparatus for wireless communication at a network device, comprising:
   a processor;
   memory coupled with the processor; and
   instructions stored in the memory and executable by the processor to cause the apparatus to:
      identify first data to be transmitted by a first user equipment (UE);
      identify symbols on which at least one second UE is to transmit second data;
      determine, based at least in part on the identified symbols for the at least one second UE, resources allocated for an uplink transmission of the first data by the first UE, a set of the allocated resources corresponding to a plurality of repetitions for which the first UE to transmit the uplink transmission according to a first power level, the first power level greater than a second power level configured for uplink transmissions and the set of allocated resources overlapping at least in part the symbols on which the at least one second UE is to transmit the second data; and
      transmit, to the first UE, a control signal identifying the allocated resources, the first power level associated with the uplink transmission, and the set of the allocated resources on which the first UE is to transmit the uplink transmission according to the first power level, wherein the control signal indicates the plurality of repetitions for which the UE is to transmit the uplink transmission.

* * * * *